United States Patent Office 3,461,120
Patented Aug. 12, 1969

3,461,120
N-[(1-PIPERIDYL)-LOWER-ALKYL]-N-[(3-, 2-, AND 1-INDOLYL)-LOWER-ALKYL] AMINES
Bernard L. Zenitz, Colonie, and Donald Craig Behn, Schodack, N.Y., assignors to Sterling Drug Inc., New York, N.Y., a corporation of Delaware
No Drawing. Continuation-in-part of application Ser. No. 457,196, May 19, 1965, which is a division of application Ser. No. 193,310, May 8, 1962. This application Sept. 27, 1965, Ser. No. 490,699
Int. Cl. C07d 57/00, 27/56; A61k 27/00
U.S. Cl. 260—240          17 Claims

ABSTRACT OF THE DISCLOSURE

New N-[(1-piperidyl)-lower-alkyl]-N-[(3-, 2-, and 1-indolyl)-lower-alkyl]amines having useful hypotensive, monoamine oxidase inhibitory, and coronary dilator activities.

---

This application is a continuation-in-part of our prior copending application Ser. No. 457,196, filed May 19, 1965, now abandoned, which is a division of our prior copending application Ser. No. 193,310, filed May 8, 1962, now U.S. Patent 3,211,736, patented Oct. 12, 1965.

This invention relates to new N-[(1-piperidyl)-lower-alkyl]-N-[(3-, 2-, and 1-indolyl)-lower alkyl]amines.

More particularly the compounds of the invention have the formula

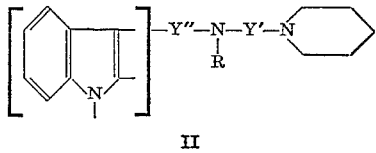

II wherein the group

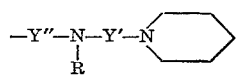

is in one of the 1-, 2- or 3-positions of the indole nucleus, $Y'$ and $Y''$ are each lower-alkylene, which can be straight or branched, of from two to seven carbon atoms, and R is the group

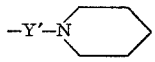

or a member of the group consisting of
hydrogen,
lower-alkanoyl,
lower-alkyl,
benzoyl,
phenyl-lower-alkyl,
phenyl-lower-alkenyl,
cycloalkyl-lower-alkanoyl,
cycloalkyl-lower-alkyl,
phenyl-lower-alkanoyl,
phenyl-lower-alkenoyl,
pyridylcarbonyl,
carboxy-lower-alkanol,
hydroxy-lower-alkyl,
cyano-lower-alkyl,
carbamyl,
thiocarbamyl,
N-lower-alkylcarbamyl,
N-lower-alkylthiocarbamyl,
N,N-di-lower-alkylcarbamyl,
N,N-di-lower-alkylthiocarbamyl,
N-lower-alkenyl-carbamyl,
N-lower-alkenylthiocarbamyl,
N,N-di-lower-alkenyl-carbamyl,
N,N-di-lower-alkenylthiocarbamyl,
N-phenylcarbamyl,
N-phenylthiocarbamyl,
N-cycloalkylcarbamyl,
N-cycloalkylthiocarbamyl, or
phenoxy-lower-alkanoyl.

The compounds of the invenion thus can be represented by the formulas

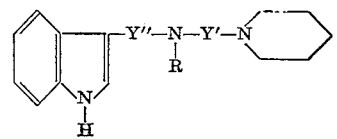

IIa

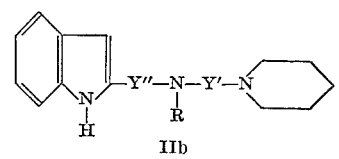

IIb

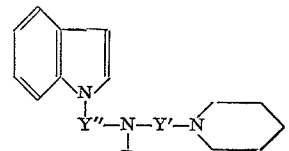

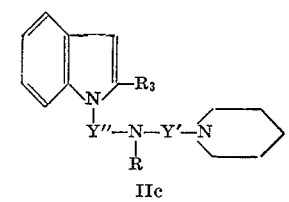

IIc

Moreover, the piperidine ring or the indole nucleus of the above compounds can be further substituted in any of the available positions thereof by substituents of a non-critical nature such as would occur to the man skilled in organic chemistry. Thus the compounds of the invention can also be represented by the composite formula

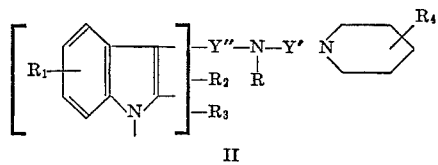

II or by the formulas

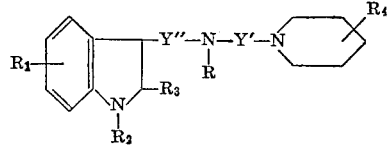

IIa

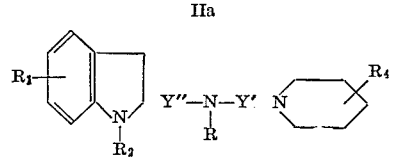

IIb

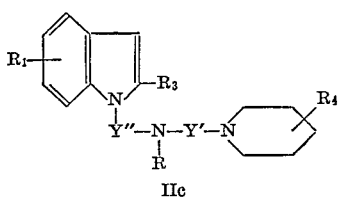

IIc wherein R, Y' and Y" have the meanings given above and R₁, R₂, R₃ and R₄ are the non-critical substituents mentioned above. For example R₁ can be from one to four of such substituents as hydroxy, lower-alkoxy, phenyl-lower-alkoxy, methylenedioxy, lower-alkylmercapto, lower-alkylsulfonyl, halogen, and the like; R₂ can be, for example, lower-alkyl or phenyl-lower-alkyl; R₃ can be, for example, lower-alkyl, phenyl, or phenyl-lower-alkyl; and R₄ can be, for example, hydroxy, hydroxy-lower-alkyl, lower-alkanoyloxy benzoyloxy, lower-alkanoyloxy-lower-alkyl, benzoyloxy-lower-alkyl, unsubstituted carbamyl, N-lower-alkylcarbamyl, N,N-di-lower-alkylcarbamyl, N-lower-alkenylcarbamyl, N,N-di-lower - alkenylcarbamyl, lower - alkanoylamino, lower-alkyl, phenyl-lower-alkyl, or cycloalkyl-lower-alkyl.

As used herein, the term "lower-alkyl" means saturated, monovalent aliphatic radicals, including straight and branched-chain radicals, of from one to four carbon atoms as illustrated by, but not limited to, methyl, ethyl, propyl, isopropyl, butyl, sec.-butyl, and the like.

As used herein, the term "lower-alkoxy" means saturated, aliphatic, straight or branched-chain radicals of from one to four carbon atoms as illustrated by, but not limited to, methoxy, ethoxy, propoxy, isopropoxy, butoxy, and the like.

As used herein, the term "lower-alkenyl" means monovalent, aliphatic radicals of from three to seven carbon atoms which contain at least one double bond, and are either straight or branched-chain as illustrated by, but not limited to, 1-(2-propenyl), 1-(3-methyl-2-propenyl), 1-(1,3-dimethyl-2-propenyl), 1-(2-hexenyl), and the like.

As used herein, the term "lower-alkanoyl" means saturated, monovalent, aliphatic radicals derived from a monocarboxylic acid, including straight or branched-chain radicals of from one to six carbon atoms as illustrated by, but not limited to, formyl, acetyl, propionyl, α-methylpropionyl, butyryl, hexanoyl, and the like.

As used herein, the term "lower-alkenoyl" means monovalent, aliphatic radicals of from three to seven carbon atoms which contain at least one double bond, and are either straight or branched-chain as illustrated by, but not limited to, acryloyl, crotonoyl, α-methylcrotonoyl, β-ethylacryloyl, α-propylcrotonoyl, and the like.

As used herein, the term "cycloalkyl" means cyclic saturated aliphatic radicals of from three to eight carbon atoms as illustrated by, but not limited to, cyclopropyl, cyclobutyl, α-methylcyclobutyl, cyclohexyl, 4-methylcyclohexyl, cyclooctyl, and the like.

As used herein, the terms "pheny-lower-alkoxy," "phenyl - lower - alkyl," "phenyl - lower - alkanoyl," and "phenyl-lower-alkenoyl" mean a monovalent radical consisting of a phenyl nucleus bonded to the rest of the molecule, respectively, through a divalent lower-alkyleneoxy radical of from one to four carbon atoms as illustrated by, but not limited to, methyleneoxy, 1,2-ethyleneoxy, 1,3-propyleneoxy, 1,4-butyleneoxy, and the like; or through a divalent, lower-alkylene radical of from one to four carbon atoms as illustrated by, but not limited to, methylene, 1,1-ethylene, 1,2-ethylene, 1,3-propylene, 1,2-propylene, 1,4-butylene, and the like; or through a divalent lower-alkylenoyl radical of from one to four carbon atoms as illustrated by, but not limited to, carbonyl, acetyl, β-propionyl, α-methyl-β-propionyl, γ-butyryl, and the like; or through a divalent, lower-alkenylenoyl radical of from three to four carbon atoms as illustrated by, but not limited to, β-propenoyl, α-methyl-β-propenoyl, β-methyl-β-propenoyl, and the like. Here and elsewhere throughout this specification, it will be understood that the benzene ring of phenyl (or benzoyl) can bear any number and kind of substituents such as would occur to the man skilled in organic chemistry. Solely for illustration, and without limitation, such substituents include lower-alkyl, lower-alkoxy, halogen (fluorine, chlorine, bromine, and iodine), lower-alkanoylamino, lower-alkylmercapto, lower-alkylsulfinyl, lower-alkylsulfonyl, nitro, trifluoromethyl, and the like.

The compounds of the present invention, where R is the group

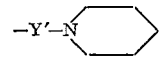

or hydrogen, are prepared by methods generally known for preparing secondary and tertiary amines as described more fully in our parent application S.N. 193,310. Thus one method comprises lithium aluminum hydride reduction of the amides corresponding to the compounds of Formula II and, in their particularly preferred aspect, having the Formula I

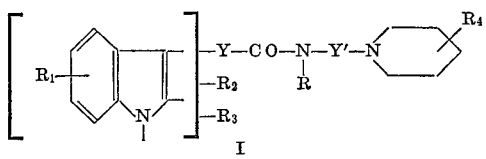

where R₁, R₂, R₃, R₄ and Y' have the meanings given above, Y is lower-alkylene of from one to six carbon atoms, and R is the group

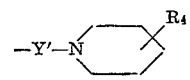

or hydrogen. This method is particularly suitable for the preparation of compounds where the amides of Formula I contain no other groups reducible by the lithium aluminum hydride. The reaction is carried out at a temperature in the range from about 0° C. to about 65° C. in an organic solvent inert under the conditions of the reaction, for example diethyl ether or tetrahydrofuran.

The intermediate amides of Formula I are prepared by methods generally known in the art, for example by reaction of an amine of the formula

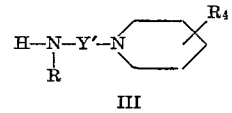

where R is the group

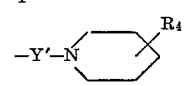

or hydrogen, with a mixed anhydride of a lower-alkyl carbonic acid and a (3-, 2-, or 1-indolyl)-lower-alkanoic acid or with a (3-, 2-, or 1-indolyl)-lower-alkanoyl halide, as more fully described in our earlier application S.N. 193,310.

Alternatively the compounds of Formula II, where R is the group

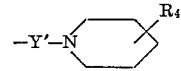

or a hydrogen atom, are prepared by reacting an N-[(1-piperidyl)-lower-alkyl]amine or an N,N-bis-[(1-piperidyl)-lower-alkyl]amine of Formula III at a temperature between about 50° C. and about 150° C. in the presence of an acid-acceptor with a (3-, 2-, or 1-indolyl)-lower-alkyl halide having the formula

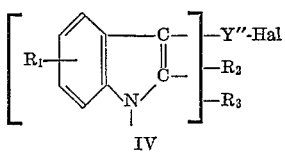

where $R_1$, $R_2$, $R_3$, and $Y''$ have the meanings given above, Hal is halogen, and where any one of the three free valences on the indole nucleus at the 3-, 2-, and 1-positions is taken up by the —$Y''$—Hal group, and the valences at the 1-and 2-positions when not taken up by the —$Y''$—Hal group, are taken up by the groups $R_2$ and $R_3$, respectively. The compounds of Formula IV thus can also be represented by the formulas

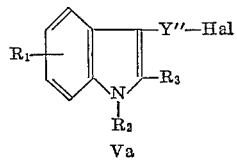

Va

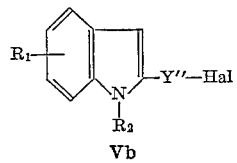

Vb

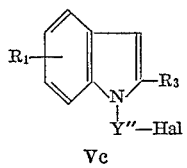

Vc

The reaction is preferably carried out in an organic solvent, inert under the conditions of the reaction, for example anhydrous ethanol, isopropanol, acetonitrile, and the like. The purpose of the acid-acceptor is to take up the hydrogen halide which is split out during the course of the reaction. The acid-acceptor is a basic substance which forms water-soluble by-products easily separable from the main product of the reaction and includes such substances as alkali metal salts of weak acids, e.g. sodium carbonate, sodium bicarbonate, potassium carbonate, sodium acetate, sodium alkoxides, and the like. The acid-acceptor can also be in the form of an excess quantity of the N-[(1-piperidyl)-lower-alkyl]amine or N,N-bis-[(1-piperidyl)-lower-alkyl]amine.

The compounds of Formulas IIa, b, and c, where R is lower-alkanoyl, benzoyl, phenyl-lower-alkenoyl, cycloalkyl-lower-alkanoyl, phenyl-lower-alkanoyl, pyridylcarbonyl, carboxy-lower-alkanoyl, or phenoxy-lower-alkanoyl, are advantageously prepared by reaction of the secondary amines of Formulas IIa, b, and c (where R is hydrogen) with the acid chloride or anhydride corresponding to R. The reaction is preferably carried out in an organic solvent inert under the conditions of the reaction and in the presence of an acid-acceptor which serves to take up the hydrogen chloride (from an acid chloride) or the organic acid (from an acid anhydride) which is split out during the reaction.

Alternatively, the compounds where R is phenyl-lower-alkanoyl are prepared by catalytic reduction of the corresponding compounds where R is phenyl-lower-alkenoyl.

The compounds of Formulas IIa, b, or c, where R is lower-alkyl, phenyl-lower-alkyl, hydroxy-lower-alkyl, or cycloalkyl-lower-alkyl, are advantageously prepared from the corresponding compounds where R is lower-alkanoyl, phenyl-lower-alkanoyl, carbonoxy-lower-alkanoyl, or cycloalkyl-lower-alkanoyl, respectively, by reducing the latter with an alkali metal aluminum hydride using the same conditions as those described above for the preparation of compounds of Formulas IIa, b, and c from the compounds of Formulas Ia, b, and c.

The compounds of Formulas IIa, b, and c, where R is carbamyl or thiocarbamyl, are prepared from the corresponding compounds where R is hydrogen by reacting the latter with an alkali metal or ammonium isocyanate or isothiocyanate in the presence of one molar equivalent of a mineral acid.

The compounds of Formulas IIa, b, and c, where R is N-lower-alkylcarbamyl, N-lower-alkylthiocarbamyl, N-lower-alkenylcarbamyl, N-lower-alkenylthiocarbamyl, N-phenylcarbamyl, N-phenylthiocarbamyl, N-cycloalkylcarbamyl, or N-cycloalkylthiocarbamyl, are prepared by reacting the compounds of Formulas IIa, b, and c, where R is hydrogen, with a lower-alkylisocyanate, lower-alkylisothiocyanate, lower-alkenylisocyanate, lower-alkenylisothiocyanate, phenylisocyanate, phenylisothiocyanate, cycloalkylisocyanate, or cycloalkylisothiocyanate, respectively.

The compounds of Formulas IIa, b, and c, where R is N,N-di-lower-alkylcarbamyl, N,N-di-lower-alkylthiocarbamyl, N,N-di-lower-alkenylcarbamyl, or N,N-di-lower-alkenylthiocarbamyl, are prepared by reacting, in the presence of an acid-acceptor, the compounds of Formulas IIa, b, and c, where R is hydrogen, with an N,N-di-lower-alkylcarbamyl chloride, an N,N-di-lower-alkylthiocarbamyl chloride, an N,N-di-lower-alkenylcarbamyl chloride, or an N,N-di-lower-alkenylthiocarbamyl chloride, respectively.

The compounds of Formulas IIa, b, and c, where R is cyano-lower-alkyl, are prepared by reacting the corresponding compounds where R is hydrogen with a cyano-lower-alkyl halide in the presence of an acid-acceptor which serves to take up the hydrogen halide which is split out during the course of the reaction.

Alternatively the compounds of Formulas IIa, b, and c, where R is a cyanoethyl group, are prepared by reacting the corresponding secondary amines (R is hydrogen) with acrylonitrile.

The intermediate N-[(1-piperidyl)-lower-alkyl]amines and N,N-bis-[(1-piperidyl)-lower-alkyl]amines of Formula III are prepared by reducing with hydrogen in the presence of a rhodium-on-alumina catalyst a 1-(cyano-lower-alkyl)piperidine having the formula

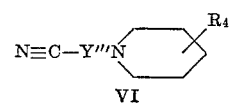

VI where $Y'''$ is lower-alkylene containing from one to five carbon atoms and $R_4$ has the meanings given above. The reduction is carried out in an organic solvent inert under the conditions of the reaction, for example methanol, ethanol, isopropanol and the like, and at hydrogen pressures in the range from about 50 pounds p.s.i. to about 1000 pounds p.s.i. In the reduction both the N-mono- and N,N-bis[(1-piperidyl)-lower-alkyl]amines are produced. When the reaction is carried out in a neutral medium, that is a medium containing only the 1-(cyano-lower-alkyl)piperidine of Formula VI dissolved in the solvent, the N,N-bis-[(1-piperidyl)-lower-alkyl]amines of Formula III (R is the group

are produced predominantly. However, when the reduction is carried out in an ammoniacal medium, that is a medium containing anhydrous ammonia in addition to the 1-(cyano-lower-alkyl)-piperidine in the solvent, the N-mono-[(1-piperidyl)-lower-alkyl]amines of Formula III (R is hydrogen) are produced predominantly.

The 1-(cyano-lower-alkyl)piperidines of Formula VI are prepared by reacting a halo-lower-alkanonitrile with an appropriate substituted piperidine at a temperature between about 50° C. and about 150° C. in the presence of an acid-acceptor. The reaction is represented by the equation

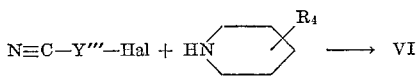

where $R_4$ and $Y'''$ have the meanings given above and Hal represents halogen. The reaction is preferably carried out in an organic solvent inert under the conditions of the reaction, for example ethanol, isopropanol, acetonitrile, and the like. The purpose of the acid-acceptor is to take up the hydrogen halide which is split out during the course of the reaction. The acid-acceptor is a basic substance with forms water-soluble by-products easily separable from the main product of the reaction and includes such substances as alkali metal salts of weak acids, e.g., sodium or potassium carbonate, sodium bicarbonate, sodium acetate, sodium alkoxides, and the like. The acid-acceptor can also be in the form of an excess quantity of the substituted-piperidine.

The 1-(cyano-lower-alkyl)piperidines of Formula VI where $Y'''$ is a lower-alkylene group interposing two carbon atoms between the cyano group and the piperidine nitrogen atom can also be prepared by reacting an appropriate substituted-piperidine with a 1-lower-alkenyl-nitrile. The reaction is represented by the equation

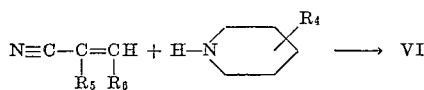

where $R_4$ has the meanings given above and $R_5$ and $R_6$ are hydrogen or lower-alkyl containing a total of three carbon atoms in the alkyl group when only one of $R_5$ and $R_6$ is lower-alkyl and containing a total of three carbon atoms in both alkyl groups when both of $R_5$ and $R_6$ is lower-alkyl. The reaction is carried out at a temperature between about 0° C. and about 30° C. and can be carried out either with or without a solvent. It is preferred to use either water or an excess of the 1-lower-alkenyl-nitrile as the solvent.

The novel compounds of the instant invention are the compounds of Formulas IIa, b, and c and their acid-addition and quaternary ammonium salts. The compounds of Formulas IIa, b, and c, in free base form, are converted to the acid-addition salt form by interaction of the base with an acid. In like manner, the free bases can be regenerated from the acid-addition salt form in the conventional manner, that is by treating the salts with strong aqueous bases, for example alkali metal hydroxides, alkali metal carbonates, and alkali metal bicarbontes. The bases thus regenerated can then be interacted with the same or a different acid to give back the same or a different acid-addition salt. Thus the novel bases and all of their acid-addition salts are readily interconvertible.

It will thus be appreciated that each of Formulas IIa, b, and c not only represents the structural configuration of the bases of our invention, but each is also representative of the respective structural entity which is common to all of our respective compounds of Formulas IIa, b, and c whether in the form of the free bases or in the form of the acid-addition salts of the bases. We have found that by virtue of this common structural entity, the bases and their acid-addition salts have inherent pharmacodynamic activity of a type to be more fully described hereinbelow. This inherent pharmacodynamic activity can be enjoyed in useful form for pharmaceutical purposes by employing the free bases themselves or the acid-addition salts formed from pharmaceutically-acceptable acids, that is, acids whose anions are innocuous to the animal organism in effective doses of the salts so that beneficial properties inherent in the common structural entity represented by the free bases are not vitiated by side-effects ascribable to the anions.

In utilizing this pharmacodynamic activity of the salts of the invention, we prefer of course to use pharmaceutically-acceptable salts. Although water-insolubility, high toxicity, or lack of crystalline character may make some particular salt species unsuitable or less desirable for use as such in a given pharmaceutical application, the water-insoluble or toxic salts can be converted to the corresponding pharmaceutically-acceptable bases by decomposition of the salt with aqueous base as explained above, or alternatively, they can be converted to any desired pharmaceutically-acceptable acid-addition salt by double decomposition reactions involving the anion, for example, by ion-exchange procedures.

Moreover, apart from their usefulness in pharmaceutical applications, our salts are useful as characterizing or identifying derivatives of the free bases or in isolation or purification procedures. Like all of the acid-addition salts, such characterizing or purification salt derivatives can, if desired, be used to regenerate the pharmaceutically-acceptable free bases by reaction of the salts with aqueous base, or alternatively can be converted to a pharmaceutically-acceptable acid-addition salt by, for example, ion-exchange procedures.

It will be appreciated from the foregoing that all of the acid-addition salts of our new bases are useful and valuable compounds regardless of considerations of solubility, toxicity, physical form, and the like, and accordingly are within the purview of the instant invention.

The novel features of the compounds of the invention, then, resides in the concept of the bases and the cationic forms of the new compounds of Formulas IIa, b, and c and not in any particular acid moiety or acid anion associated with the salt forms of our compounds; rather, the acid moieties or anions which can be associated in the salt forms are in themselves neither novel nor critical and therefore can be any acid anion or acid-like substance capable of salt formation with bases. In fact, in aqueous solutions, the base form or water-soluble acid-addition salt form of the compounds of the invention both possess a common protonated cation or ammonium ion.

Thus the acid-addition salts discussed above and claimed herein are prepared from any organic acid, inorganic acid (including organic acids having an inorganic group therein), or organo-metallic acid as exemplified by organic mono- and poly-carboxylic acids; such as found, for example, in Beilstein's Organische Chemie, 4th ed., volumes III, IV, IX, X, XIV, XVII, XIX, XXI, XXII, and XXV; organic mono- and polysulfonic and -sulfinic acids; such as found, for example, in Beilstein volumes VI, XI, XVI, and XXII; organic phosphonic and phosphinic acids; such as found, for example, in Beilstein volumes XI and XVI; organic acids of arsenic and antimony; such as found, for example, in Beilstein volume XVI; organic heterocyclic carboxylic, sulfonic, and sulfinic acids such as found, for example, in Beilstein volumes XVIII, XXII, and XXV; acidic ion-exchange resins, and inorganic acids of any acid-forming element or combination of elements, such as found in Mellor, Comprehensive Treatise in Inorganic and Theoretical Chemistry, Longman's, Green and Co., New York, N.Y., volumes I–XVI. In addition, other salt-forming compounds which are acidic in their chemical properties but which are not generally considered as acids in the same sense as carboxylic or sulfonic acids are also considered to be among the numerous acids which can be used to prepare acid-addition salts of the compounds of the invention. Thus there is also comprehended acidic phenolic compounds, such as found, for example, in volume VI of Beilstein, acidic compounds having "activated" or acidic hydrogen atoms, as for example, picrolonic acid, or barbituric acid derivatives having an acidic proton, such as found, for example, in Cox et al. Medicinal Chemistry, vol. IV, John Wiley and Sons, Inc., New York, N.Y. (1959).

Also comprehended as salt forming agents are so-called Lewis acids which lack a pair of electrons in the outer "electron shell" and react with basic compounds having an unshared pair of electrons to form salts, for example boron trifluoride.

Thus appropriate acid-addition salts are those derived from such diverse acids as formic acid, acetic acid, isobutyric acid, alpha-mercaptopropionic acid, malic acid, fumaric acid, succinic acid, succinamic acid, tartaric acid, citric acid, lactic acid, benzoic acid, 4-methoxybenzoic acid, phthalic acid, anthranilic acid, 1-naphthalenecarboxylic acid, cinnamic acid, cyclohexanecarboxylic acid, mandelic acid, tropic acid, crotonic acid, acetylene dicarboxylic acid, sorbic acid, 2-furancarboxylic acid, cholic acid, pyrenecarboxylic acid, 2-pyridinecarboxylic acid, 3-indoleacetic acid, quinic acid, sulfamic acid, methanesulfonic acid, isethionic acid, benzenesulfonic acid, p-toluenesulfonic acid, benzenesulfinic acid, butylarsonic acid, diethylphosphinic acid, p-aminophenylarsinic acid, phenylstibnic acid, phenylphosphinous acid, methylphosphinic acid, phenylphosphinic acid, hydrofluoric acid, hydrochloric acid, hydrobromic acid, hydriodic acid, perchloric acid, nitric acid, sulfuric acid, phosphoric acid, hydrocyanic acid, phosphotungstic acid, molybdic acid, phosphomolybdic acid, pyrophosphoric acid, arsenic acid, picric acid, picrolonic acid, barbituric acid, boron trifluoride, and the like.

The acid-addition salts are prepared either by dissolving the free base in an aqueous solution containing the appropriate acid and isolating the salt by evaporating the solution, or by reacting the free base and acid in an organic solvent, in which case the salt separates directly or can be obtained by concentration of the solution.

The quaternary ammonium salts of the compounds of Formulas IIa, b, and c are obtained by the addition of esters of strong acids to the free base form of the compounds, said esters having a molecular weight less than about 300. A preferred class of esters comprises alkyl, alkenyl, and monocarboxylic aryl-lower-alkyl esters of strong inorganic acids or organic sulfonic acids, including such compounds as methyl chloride, methyl bromide, methyl iodide, ethyl bromide, propyl chloride, allyl chloride, allyl bromide, methyl sulfate, methyl benzenesulfonate, methyl p-toluenesulfonate, benzyl chloride, benzyl bromide, and substituted benzyl halides, for example p-chlorobenzyl chloride, 3,4-dichlorobenzyl chloride, pentachlorobenzyl chloride, p-nitrobenzyl chloride, p-methoxybenzyl chloride, and the like.

The quaternary ammonium salts are prepared by mixing the free base and ester of a strong acid in an inert solvent. Heating may be used to facilitate the reaction, although salt formation usually takes place readily at room temperature. The quaternary ammonium salt separates directly or can be obtained by concentration of the solution.

As in the case of the acid-addition salts, water-insolubility, high toxicity, or lack of crystalline character may make some quaternary ammonium salt species unsuitable or less desirable for use as such in a given pharmaceutical application, the water-insoluble or toxic salts can be converted to the corresponding pharmaceutically-acceptable salts by double decomposition reactions involving the anion, for example, by ion-exchange procedures. Alternatively, if the anion of the original quaternary salt forms a water-insoluble silver salt, the quaternary salt will react with silver oxide in aqueous medium to form the corresponding quaternary ammonium hydroxide, the original anion being removed as a precipitate. The quaternary ammonium hydroxide solution can then be neutralized with any desired acid, weak or strong, to produce a new quaternary ammonium salt in which the anion is different from that of the original salt. In this way quaternary ammonium salts in which the anion is derived from a weak acid are formed.

Pharmacological evaluation of the compounds of Formulas Ia, b, and c have shown that they possess pharmacodynamic properties, in particular, hypotensive, monoamine oxidase inhibitory, and coronary dilator activities thus indicating their usefulness as blood pressure lowering agents, psychic energizers, and coronary dilators. The compounds of Formulas IIa, b, and c have also been shown to possess hypotensive, coronary dilator, mild analgesic, psychomotor depressant, anti-inflammatory, bacteriostatic, adrenolytic, anthelmintic, schistosomicidal, and antifungal activities thus indicating their usefulness as blood pressure lowering agents, coronary dilators, mild analgesics, CNS depressants, anti-inflammatory agents, anti-bacterial agents, adrenolytics, anthelmintics and schistosomicidal and antifungal agents.

The compounds can be prepared for use by dissolving under sterile conditions a salt form of the compounds in water (or an equivalent amount of a non-toxic acid if the free base is used), or in a physiologically compatible aqueous medium such as saline, and stored in ampoules for intramuscular injection. Alternatively, they can be incorporated in unit dosage form as tablets or capsules for oral administration either alone or in combination with suitable adjuvants such as calcium carbonate, starch, lactose, talc, magnesium stearate, gum acacia, and the like. Still further the compounds can be formulated for oral administration in aqueous alcohol, glycol or oil solutions or oil-water emulsions in the same manner as conventional medicinal substances are prepared. When used as hypotensive agents, they are formulated and used in the same manner as conventional hypotensive agents, such as reserpine preparations, and indeed can be used advantageously in combination with such hypotensive agents.

The structures of the compounds of the invention are established by their mode of synthesis and corroborated by the correspondence between calculated values for the elements and values found by chemical analysis.

The following examples will further illustrate the invention without the latter being limited thereto. In the examples, the symbols $N_T$ and $N_B$ refer to total nitrogen and basic nitrogen, respectively.

PREPARATION OF INTERMEDIATES

Example 1

4-carbomethoxy-1-(2-cyanoethyl)piperidine [VI; $R_4$ is 4-COOCH$_3$, Y''' is CH$_2$CH$_2$].

To a solution containing 37.9 g. (0.211 mole) of 4-carbomethoxypiperidine hydrochloride and 23.5 g. (0.23 mole) of triethylamine in 175 ml. of water was added 12.32 g. (0.23 mole) of acrylonitrile with stirring while maintaining the temperature at about 10° C. To the mixture was then added 80 g. of sodium chloride, the solution was stirred for several hours, filtered, and the filter cake washed with chloroform. The chloroform extract was separated from the filtrate and the raffinate extracted with chloroform. The chloroform extracts, after drying and concentration in vacuo, afforded about 35 ml. of a light yellow oil which was distilled in vacuo giving 16.78 g. of 4-carbomethoxy-1-(2-cyanoethyl)piperidine, B.P. 123.0–124.4° C./0.38 mm., M.P. 42.4–43.4° C. (corr.).

The compounds of the following examples were prepared according to the procedure described above in Example 1.

Example 2

(a) 2-carbethoxypiperidine was reacted with acrylonitrile in water to give 2-carbethoxy-1-(2-cyanoethyl)piperidine [VI; $R_4$ is 2-COOC$_2$H$_5$, Y''' is CH$_2$CH$_2$], B.P. 64.1–66.5° C./0.029–0.031 mm.; 2-carbethoxy-1-(2-cyanoethyl)piperidine hydrochloride, M.P. 185–188° C. (uncorr.) (recrystallized from an ethanol-ether mixture).

(b) 3-carbomethoxypiperidine hydrochloride was reacted with acrylonitrile in water in the presence of triethylamine to give 3-carbomethoxy-1-(2-cyanoethyl)piperidine [VI; $R_4$ is 3-COOCH$_3$, Y''' is CH$_2$CH$_2$], B.P. 68–72° C./0.023–0.025 mm., $n_D^{25}$=1.4737; 3-carbomethoxy - 1-(2 - cyanoethyl)piperidine hydrochloride, M.P.

190–192° C. (uncorr.) (recrystallized from an ethanol-ether mixture).

(c) 4-carboisobutoxypiperidine hydrochloride was reacted with acrylonitrile in water in the presence of triethylamine to give 4-carboisobutoxy-1-(2-cyanoethyl)piperidine [VI; $R_4$ is 4-COOCH$_2$CH(CH$_3$)$_2$, Y''' is CH$_2$CH$_2$], B.P. 205–207° C./16 mm., $n_D^{25}$=1.4660.

(d) 4-hydroxypiperidine was reacted with acrylonitrile in water to give 4-hydroxy-1-(2-cyanoethyl))piperidine [VI; $R_4$ is 4-OH, Y''' is CH$_2$CH$_2$], B.P. 119–122° C./0.25–0.46 mm., $n_D^{25}$=1.4961.

(e) 4-hydroxymethylpiperidine was reacted with acrylonitrile in water to give 4-hydroxymethyl-1-(2-cyanoethyl)piperidine [VI; $R_4$ is 4-CH$_2$OH, Y''' is CH$_2$CH$_2$], B.P. 102.0–104.1° C./0.065–0.071 mm., $n_D^{25}$=1.4930.

(f) 3-hydroxymethylpiperidine hydrochloride was reacted with acrylonitrile in water in the presence of triethylamine to give 3-hydroxymethyl-1-(2-cyanoethyl)piperidine [VI; $R_4$ is 3-CH$_2$OH, Y''' is CH$_2$CH$_2$], B.P. 98–100° C./0.035–0.04 mm., $n_D^{25}$=1.4948.

(g) 4-(3-hydroxypropyl)piperidine was reacted with acrylonitrile in water to give 4-(3-hydroxypropyl)-1-(2-cyanoethyl)piperidine [VI; $R_4$ is 4-CH$_2$CH$_2$CH$_2$OH, Y''' is CH$_2$CH$_2$], M.P. 44.2–45.4° C. (corr.) (recrystallized from hexane).

(h) 4-carbamylpiperidine acetate was reacted with acrylonitrile in water in the presence of triethylamine to give 4-carbamyl-1-(2-cyanoethyl)piperidine [VI; $R_4$ is 4-CONH$_2$, Y''' is CH$_2$CH$_2$], M.P. 151.0–152.6° C. (corr.) (recrystallized from ethyl acetate).

(i) 4 - (N - methylcarbamyl)piperidine hydrochloride was reacted with acrylonitrile in water in the presence of triethylamine to give 4-(N-methylcarbamyl)-1-(2-cyanoethyl)piperidine [VI; $R_4$ is 4-CONHCH$_3$, Y''' is CH$_2$CH$_2$], M.P. 116.4–117.2° C. (corr.) (recrystallized from ethyl acetate).

(j) 4-(N,N-dimethylcarbamyl)piperidine hydrochloride was reacted with acrylonitrile in water in the presence of triethylamine to give 4-(N,N-dimethylcarbamyl) - 1 - (2-cyanoethyl)piperidine [VI; $R_4$ is 4-CON(CH$_3$)$_2$, Y''' is CH$_2$CH$_2$], M.P. 65.0–66.8° C. (corr.) (recrystallized from an ethyl acetate-hexane mixture).

(k) 4-(N-ethylcarbamyl)piperidine hydrochloride was reacted with acrylonitrile in water in the presence of triethylamine to give 4-(N-ethylcarbamyl)-1-(2-cyanoethyl)piperidine [VI; $R_4$ is 4-CONHC$_2$H$_5$, Y''' is CH$_2$CH$_2$], M.P. 110.6–111.8° C. (corr.) (recrystallized from a benzene-hexane mixture).

(l) 4-(N,N-diethylcarbamyl))piperidine hydrochloride was reacted with acrylonitrile in water in the presence of triethylamine to give 4-(N,N-diethylcarbamyl)-1-(2-cyanoethyl)piperidine [VI; $R_4$ is 4-CON(C$_2$H$_5$)$_2$, Y''' is CH$_2$CH$_2$], B.P. 151–159° C./0.073–0.113 mm., $n_D^{25}$=1.4951.

(m) 4-isopropylpiperidine was reacted with acrylonitrile in benzene to give 4-isopropyl-1-(2-cyanoethyl)piperidine [VI; $R_4$ is 4-CH(CH$_3$)$_2$, Y''' is CH$_2$CH$_2$], B.P. 87–91° C./0.72 mm., $n_D^{25}$=1.4680.

(n) 4-benzylpiperidine was reacted with acrylonitrile in benzene to give 4-benzyl-1-(2-cyanoethyl)piperidine [VI; $R_4$ is 4-C$_6$H$_5$CH$_2$, Y''' is CH$_2$CH$_2$], B.P. 131.5–135° C./0.08 mm., $n_D^{25}$=1.5289.

(o) 4-cyclohexylmethylpiperidine was reacted with acrylonitrile in benzene to give 4-cyclohexylmethyl-1-(2-cyanoethyl)piperidine [VI; $R_4$ is 4-C$_6$H$_{11}$CH$_2$, Y''' is CH$_2$CH$_2$], B.P. 102.0–112° C./0.12 mm., $n_D^{25}$=1.4889.

(p) 3-acetylaminopiperidine hydrochloride was reacted with acrylonitrile in water in the presence of triethylamine to give 3-acetylamino-1-(2-cyanoethyl)piperidine [VI; $R_4$ is 3-CH$_3$CONH, Y''' is CH$_2$CH$_2$], M.P. 69.2–73.2° C. (corr.) (recrystallized from an ethyl acetate-ether mixture).

Similar to the procedure described above in Example 1, there can be obtained:

4-(3-isobutyroxypropyl)-1-(2-cyanoethyl)piperidine [VI; $R_4$ is 4-CH$_2$CH$_2$CH$_2$OCOC$_3$H$_7$, Y''' is CH$_2$CH$_2$] from 4-(3-isobutyroxypropyl)-piperidine and acrylonitrile, 4-formyloxy-1-(2-cyanoethyl)piperidine [VI; $R_4$ is 4-HCOO, Y''' is CH$_2$CH$_2$] from 4-formyloxypiperidine and acrylonitrile, 4-cyclopropylmethyl-1-(2-cyanoethyl)piperidine [VI; $R_4$ is 4-C$_3$H$_5$CH$_2$, Y''' is CH$_2$CH$_2$] from 4-cyclopropylmethylpiperidine and acrylonitrile.

Example 3

4-carbamyl - 1-cyanomethylpiperidine [VI; $R_4$ is 4-CONH$_2$, Y''' is CH$_2$].

By heating molar equivalent amounts of 4-carbamylpiperidine, α-bromoacetonitrile, and sodium carbonate in an ethanol solvent, and isolating the product from a slightly alkaline mixture, there can be obtained 4-carbamyl-1-cyanomethylpiperidine.

Example 4

4-carbamyl-1-(3-cyanopropyl)piperidine [VI; $R_4$ is 4-CONH$_2$, Y''' is CH$_2$CH$_2$CH$_2$].

By heating molar equivalent amounts of 4-carbamylpiperidine, γ-bromopropionitrile, and sodium carbonate in an ethanol solvent, and isolating the product from a slightly alkaline mixture, there can be obtained 4-carbamyl-1-(3-cyanopropyl)piperidine.

Example 5

4-carbamyl - 1-(5-cyanopentyl)piperidine [VI; $R_4$ is 4-CONH$_2$, Y''' is (CH$_2$)$_5$].

By heating molar equivalent amounts of 4-carbamylpiperidine, ε-bromocapronitrile, and sodium carbonate in an ethanol solvent, and isolating the product from a slightly alkaline mixture, there can be obtained 4-carbamyl-1-(5-cyanopentyl)piperidine.

Example 6

N-[3-(4-hydroxy-1-piperidyl)propyl]amine [III; $R_4$ is 4-HO, Y' is (CH$_2$)$_3$, R is H].

To a solution of 26.41 g. (0.17 mole) of 4-hydroxy-1-(2-cyanoethyl)piperidine, in 120 ml. of ethanol saturated with anhydrous ammonia, was added 3.0 g. of a 5 percent rhodium-on-alumina catalyst in a high pressure autoclave. The mixture was reduced with hydrogen at an initial pressure of 1030 p.s.i. and an initial temperature of about 18° C. Reduction was complete in about two and one half hours. The catalyst was removed by filtration and the filtrate evaporated to dryness in vacuo giving a dark viscous oil which was distilled in vacuo, giving 17.96 g. of an oil boiling at 93.8–98.0° C./0.12–0.15 mm. and a flask residue. The distillate was redistilled yielding 10.81 g. of N-[3-(4-hydroxy-1-piperidyl)propyl]amine, B.P. 103.8–108.0° C./0.05–0.07 mm., $n_D^{25}$=1.5058.

*Analysis.*—Calcd. for C$_8$H$_{18}$N$_2$O: C, 60.72; H, 11.46; N, 17.70. Found: C, 60.61; H, 11.29; N, 17.69.

Example 7

N,N-bis - [3 - (4-hydroxy - 1-piperidyl)propyl]amine [III; $R_4$ is 4-OH, Y' is (CH$_2$)$_3$, R is

4-HOC$_5$H$_9$N-(CH$_2$)$_3$-]

The flask residue from Example 6 was distilled at 0.002 mm. to give 3.64 g. of N,N-bis-[3-(4-hydroxy-1-piperidyl)propyl]amine, B.P. 186–193° C., $n_D^{25}$=1.5197.

*Analysis.*—Calcd. for C$_{16}$H$_{33}$N$_3$O$_2$: C, 64.17; H, 11.11; N, 14.03. Found: C, 64.14; H, 11.12; N, 14.02.

The compounds of the following examples were prepared according to the procedure described above in Example 6.

Example 8

(a) 4-(3-hydroxypropyl) - 1-(2-cyanoethyl)piperidine, in ethanol, was reduced under 790 p.s.i. of hydrogen at a temperature of 25° C. over a 5 percent rhodiumon-alumina catalyst to give N,N-bis-{3-[4-(3-hydroxypropyl)-1-piperidyl]propyl}amine [III; $R_4$ is

4-HOCH$_2$CH$_2$CH$_2$

Y′ is (CH$_2$)$_3$, R is 4-HO(CH$_2$)$_3$C$_5$H$_9$N-(CH$_2$)$_3$-], B.P. 180.0–185.5° C./0.003–0.008 mm.

A portion of the latter was converted to the trihydrochloride salt and the latter recrystallized from hot isopropanol giving N,N-bis-{3-[4-(3-hydroxypropyl)-1-piperidyl]propyl}amine trihydrochloride, M.P. 191.2–199.4° C. (corr.)

*Analysis.*—Calcd. for C$_{22}$H$_{45}$N$_3$O$_2$·3HCl: N, 8.52; Cl, 21.58. Found: N, 8.22; Cl, 21.22.

(b) 4-carbamyl-1-(2-cyanoethyl)piperidine, in ethanol saturated with ammonia, was reduced under 210 p.s.i. of hydrogen at a temperature of 25° C. over a 5 percent rhodium-on-alumina catalyst. The product was isolated in the form of the free base giving crude material of M.P. 120–144° C. (uncorr.). The latter was leeched with acetone, and the acetone insolubles were recrystallized from a benzene-hexane mixture giving N-[3-(4-carbamyl-1-piperidyl)propyl]amine [III; $R_4$ is 4-CONH$_2$, Y′ is (CH$_2$)$_3$, R is H], M.P. 85–88° C. (uncorr.).

(c) N-{3-[4-(N-methylcarbamyl)-1-piperidyl]propyl} amine dihydrochloride [III; $R_4$ is 4-CONHCH$_3$, Y′ is (CH$_2$)$_3$, R is H], was prepared by reducing 4-(N-methylcarbamyl)-1-(2-cyanoethyl)-piperidine, in methanol saturated with ammonia, with hydrogen over a 5 percent rhodium-on-alumina catalyst. The reduction was carried out under an initial hydrogen pressure of 208 p.s.i. The catalyst was removed by filtration and the solvent removed under reduced pressure giving a waxy white solid which was extracted with boiling acetone and filtered. The insoluble material (M.P. 180–191° C.) was set aside. The extracts were taken to dryness and extracted with 500 ml. of ether and filtered. The ether extracts were taken to dryness under reduced pressure giving crude material of M.P. 90–94° C. The latter was converted to the hydrochloride salt and recrystallized from an ethanol-ether mixture giving N-{3-[4-(N-methylcarbamyl)-1-piperidyl]propyl}amine dihydrochloride, M.P. 239.6–240.6° C. (corr.).

*Analysis.*—Calcd. for C$_{10}$H$_{21}$N$_3$O·2HCl: N, 15.44; Cl, 26.05. Found: N, 15.35; Cl, 26.26.

(d) The acetone insoluble material isolated above in Example 8(c) of M.P. 180–191° C. was recrystallized once from acetone and once from an ethanol-acetone mixture to give N,N-bis-{3-[4-(N-methylcarbamyl)-1-piperidyl]propyl}amine [III; $R_4$ is 4-CONHCH$_3$, Y′ is (CH$_2$)$_3$, R is 4-CH$_3$NHCOC$_5$H$_9$N-(CH$_2$)$_3$-], M.P. 203.0–203.8° C. (corr.).

*Analysis.*—Calcd. for C$_{20}$H$_{39}$N$_5$O$_2$: N$_T$, 18.36; N$_B$, 11.01. Found: N$_T$, 18.29; N$_B$, 11.02.

(e) 4 - (N,N - dimethylcarbamyl)-1-(2 - cyanoethyl)-piperidine, in 300 ml. of ethanol saturated with anhydrous ammonia, was reduced under 197 p.s.i. of hydrogen at a temperature of 25° C. over a rhodium-on-alumina catalyst to give N-{3-[4-(N,N-dimethylcarbamyl)-1-piperidyl]propyl}amine [III; $R_4$ is 4-CON(CH$_3$)$_2$, Y′ is (CH$_2$)$_3$, R is H], B.P. 123–124° C./0.09 mm., $n_D^{25}$=1.5040.

*Analysis.*—Calcd. for C$_{11}$H$_{23}$N$_3$O: N$_T$, 19.71; N$_B$, 13.14. Found: N$_T$, 19.39; N$_B$, 12.83.

(f) 4-(N,N-dimethylcarbamyl) - 1 - (2 - cyanoethyl)-piperidine, in ethanol, was reduced with hydrogen over a 5 percent rhodium-on-alumina catalyst. The catalyst was removed by filtration, the solvent removed under reduced pressure, and the residue was extracted with boiling hexane. The insoluble material was extracted with ether, the ether extracts taken to dryness and the residue extracted with hexane and the extracts combined with the hexane extracts from above. The latter were taken to dryness giving crude material which on repeated recrystallization from hexane gave N,N-bis-{3 - [4 - (N,N-dimethylcarbamyl)-1-piperidyl]-propyl}amine [III; $R_4$ is

4-CON(CH$_3$)$_2$

Y′ is (CH$_2$)$_3$, R is 4-(CH$_3$)$_2$NCOC$_5$H$_9$N-(CH$_2$)$_3$-], M.P. 87.8–88.6° C. (corr.).

*Analysis.*—Calcd. for C$_{22}$H$_{43}$N$_5$O$_2$: C, 64.51; H, 10.58; N, 17.10. Found: C, 64.50; H, 10.41; N, 17.12.

(g) 4 - (N-ethylcarbamyl)-1-(2-cyanoethyl)piperidine, in ethanol saturated with anhydrous ammonia, was reduced under 61 p.s.i. of hydrogen over a rhodium-on-alumina catalyst. After removal of the catalyst, the solvent was removed in vacuo and the white solid residue extracted with ether and the ether extracts taken to dryness giving a white waxy solid. The latter was converted to the dihydrochloride salt and recrystallized from an ethanol-ether mixture giving N - {3 - [4 - (N - ethylcarbamyl)-1-piperidyl]propyl}amine dihydrochloride [III; $R_4$ is 4-CONHC$_2$H$_5$, Y′ is (CH$_2$)$_3$, R is H], M.P. 245.0–246.2° C. (corr.).

*Analysis.*—Calcd. for C$_{11}$H$_{23}$N$_3$O·2HCl: N, 14.69; Cl, 24.80. Found: N, 14.62; Cl, 24.50.

(h) 4 - (N-ethylcarbamyl)-1-(2-cyanoethyl)piperidine, in ethanol saturated with anhydrous ammonia, was reduced under 59 p.s.i. of hydrogen over a 5 percent rhodium-on-alumina catalyst. The crude product was extracted with ether and filtered. The ether insoluble material was washed with acetone, then with ether and air-dried giving crude material of M.P. 188–189° C. (uncorr.). Recrystallization from an ethanol-ether mixture afforded N,N - bis-{3-[4-(N-ethylcarbamyl)-1-piperidyl]-propyl}amine [III; $R_4$ is 4-CONHC$_2$H$_5$, Y′ is (CH$_2$)$_3$, R is 4-C$_2$H$_5$NHCOC$_5$H$_9$N-], M.P. 191.2–192.80 C. (corr.).

*Analysis.*—Calcd. for C$_{22}$H$_{43}$N$_5$O$_2$: C, 64.50; H, 10.58; N, 17.10. Found: C, 64.43; H, 10.26; N, 17.42.

(i) 4 - (N,N-diethylcarbamyl)-1-(2-cyanoethyl)piperidine, in ethanol saturated with anhydrous ammonia, was reduced under 235 p.s.i. of hydrogen at a temperature of 24° C. over a 5 percent rhodium-on-alumina catalyst. The crude product was taken into ether and allowed to stand over night. The solid which separated was collected by filtration and the filtrate taken to dryness giving a dark viscous oil which was distilled in vacuo to give N-{3-[4-(N,N-diethylcarbamyl) - 1 - piperidyl]-propyl}-amine [III; $R_4$ is 4-CON(C$_2$H$_5$)$_2$, Y′ is (CH$_2$)$_3$, R is H], B.P. 131–138° C./0.109–0.113 mm., $n_D^{25}$=1.4938.

*Analysis.*—Calcd. for C$_{13}$H$_{27}$N$_3$O: N$_T$, 17.42; N$_B$, 11.61. Found: N$_T$, 17.35; N$_B$, 11.59.

(j) 4 - (3-hydroxypropyl)-1-(2-cyanoethyl)piperidine, in ethanol, was reduced under 790 p.s.i. of hydrogen at a temperature of 25° C. over a 5 percent rhodium-on-alumina catalyst to give N-{3-[4-(3-hydroxypropyl)-1-piperidyl]propyl}amine [III; $R_4$ is 4-HOCH$_2$CH$_2$CH$_2$, Y′ is (CH$_2$)$_3$, R is H], B.P. 89–104° C./0.004 mm. The latter was converted to the dihydrochloride salt to give N-{3-[4-(3-hydroxypropyl)-1-piperidyl]propyl}amine dihydrochloride, M.P. 163.8–165.2° C. (corr.) (recrystallized from isopropanol).

*Analysis.*—Calcd. for C$_{11}$H$_{24}$N$_2$O·2HCl: C, 48.35; H, 9.59; Cl, 25.95. Found: C, 48.52; H, 9.57; Cl, 25.46.

(k) 4-isopropyl-1-(2-cyanoethyl)piperidine, in ethanol, was reduced under 70 p.s.i. of hydrogen at a temperature of about 60° C. over a 5 percent rhodium-on-alumina catalyst. The catalyst was removed by filtration, the filtrate taken to dryness and the residue distilled in vacuo giving a forerun of B.P. 35–45° C./0.05 mm. A second cut of B.P. 125–131° C./0.014 mm. was collected as N,N-bis-[3-(4-isopropyl-1-piperidyl)propyl]amine [III; $R_4$ is 4-(CH$_3$)$_2$CH, Y′ is (CH$_2$)$_3$, R is 4-(CH$_3$)$_2$CHC$_5$H$_9$N-(CH$_2$)$_3$-].

*Analysis.*—Calcd. for C$_{22}$H$_{45}$N$_3$: C, 75.15; H, 12.90; N, 11.95. Found: C, 75.18; H, 13.00; N, 12.16.

(l) The forerun from Example 8(j) of B.P. 35–45° C./0.05 mm. above was converted to the hydrochloride salt to give N-[3-(4-isopropyl-1-piperidyl)propyl]amine dihydrochloride [III; $R_4$ is 4-$(CH_3)_2$CH, Y' is $(CH_2)_3$, R is H], M.P. 163.8–165.2° C. (corr.) (recrystallized from isopropanol-acetone).

*Analysis.*—Calcd. for $C_{11}H_{24}N_2 \cdot 2HCl$: C, 51.35; H, 10.19; N, 10.89. Found: C, 51.58; H, 10.21; N, 10.71.

(m) 4-benzyl - 1 - (2-cyanoethyl)piperidine, in ethanol, was reduced under 63 p.s.i. of hydrogen at a temperature of about 60° C. over a 5 percent rhodium-on-alumina catalyst. The crude product was distilled in vacuo, and the fraction boiling at 88–97° C./0.05 mm. was collected as N-[3-(4-benzyl-1-piperidyl)-propyl]amine [III; $R_4$ is 4-$C_6H_5CH_2$, Y' is $(CH_2)_3$, R is H].

*Analysis.*—Calcd. for $C_{15}H_{24}N_2$: N, 12.06. Found: N, 11.86.

(n) A second fraction from the distillation of the crude product obtained above in Example 8(m) was collected at 198–215° C./0.001 mm. which was taken into ether and treated with an excess of ethereal hydrochloric acid to give N,N-bis-[3-(4-benzyl-1-piperidyl)propyl]amine trihydrochloride [III; $R_4$ is 4-$C_6H_5CH_2$, Y' is $(CH_2)_3$, R is 4-$C_6H_5CH_2C_5H_9N$-$(CH_2)_3$-], M.P. 266.6–268.0° C. (corr.) (recrystallized from isopropanol).

*Analysis.*—Calcd. for $C_{30}H_{45}N_3 \cdot 3HCl$: C, 64.68; H, 8.69; Cl, 19.10. Found: C, 64.57; H, 8.93; Cl, 18.96.

(o) 4-cyclohexylmethyl-1-(2-cyanoethyl)piperidine, in ethanol saturated with anhydrous ammonia, was reduced under 780 p.s.i. of hydrogen at a temperature of 22° C. over a 5 percent rhodium-on-alumina catalyst. The crude product was distilled in vacuo giving material of B.P. 88–94° C./0.01–0.02 mm. which was taken into ether and treated with an excess of ethereal hydrochloric acid to give N - [3 - (4-cyclohexylmethyl - 1 - piperidyl)-propyl]amine dihydrochloride [III; $R_4$ is 4-$C_6H_{11}CH_2$, Y' is $(CH_2)_3$, R is H], M.P. 280.2–282.4° C. (corr.).

*Analysis.*—Calcd. for $C_{15}H_{30}N_2 \cdot 2HCl$: C, 57.87; H, 10.36; Cl, 22.78. Found: C, 57.78; H, 10.40; Cl. 22.59.

(p) 3-acetylamino-1-(2-cyanoethyl)piperidine, in ethanol saturated with anhydrous ammonia, was reduced under 824 p.s.i. of hydrogen at a temperature of 27° C. over a 5 percent rhodium-on-alumina catalyst. The crude product was distilled in vacuo at 0.05–0.06 mm. and the fraction boiling at 147–150° C./0.05–0.07 mm. was collected as N-[3-(3-acetylamino-1-piperidyl)propyl]amine [III; $R_4$ is 3-$CH_3CONH$, Y' is $(CH_2)_3$, R is H].

*Analysis.*—Calcd. for $C_{10}H_{21}N_3O$: C, 60.26; H, 10.62; $N_B$, 14.06. Found: C, 60.38; H, 10.51; $N_B$, 14.19.

Similar to the procedure described above in Example 6, there can be obtained:

N-[3-(4-formyloxy-1-piperidyl)propyl]amine [III; $R_4$ is 4-HCOO, Y' is $(CH_2)_3$, R is H] from 4-formyloxy-1-(2-cyanoethyl)piperidine, N-{3-[4-(3-isobutyroxypropyl)-1-piperidyl]propyl}amine [III; $R_4$ is 4-$CH_2CH_2CH_2OCOC_3H_7$, Y' is $(CH_2)_3$, R is H] from 4 - (3-isobutyroxypropyl)-1-(2-cyanoethyl)piperidine, N-[3-(4-benzoyloxy-1-piperidyl)propyl]amine [III; $R_4$ is 4-$C_6H_5COO$, Y' is $(CH_2)_3$, R is H] from 4-benzoyloxy-1-(2-cyanoethyl)piperidine, N-[2-(4-carbamyl-1-piperidyl)ethyl]amine [III; $R_4$ is 4-$CONH_2$, Y' is $(CH_2)_2$, R is H] from 4-carbamyl-1-cyanomethylpiperidine, N-[4-(4-carbamyl-1-piperidyl)butyl]amine [III; $R_4$ is 4-$CONH_2$, Y' is $(CH_2)_4$, R is H] from 4-carbamyl-1-(3-cyanopropyl)piperidine, N,N - bis - [3-(3-acetylamino-1-piperidyl)propyl]amine [III; $R_4$ is 3-$CH_3CONH$, Y' is $(CH_2)_3$, R is 3-$CH_3CONHC_5H_9N$-$(CH_2)_3$-] from 3-acetylamino-1-(2-cyanoethyl)piperidine, N - [3 - (4-cyclopropylmethyl-1-piperidyl)propyl]amine [III; $R_4$ is 4-$C_3H_5CH_2$, Y' is $(CH_2)_3$, R is H] from 4-cyclopropylmethyl-1-(2-cyanoethyl)piperidine, and N-[6-(4-carbamyl-1-piperidyl)hexyl]amine [III; $R_4$ is 4-$CONH_2$, Y' is $(CH_2)_6$, R is H] from 4-carbamyl-1-(5-cyanopentyl)piperidine.

PREPARATION OF FINAL PRODUCTS

Example 9

N - [3 - (4 - carbamyl-1-piperidyl)propyl]-N-[β-(3-indolyl)propionyl]amine [Ia; $R_1$, $R_2$, $R_3$ are H, $R_4$ is 4-$CONH_2$, Y is $CH_2CH_2$, Y' is $CH_2CH_2CH_2$, R is H].

To a solution of 5.68 g. (0.03 mole) of β-(3-indolyl)-propionic acid and 3.54 g. (0.033 mole) of triethylamine in 200 ml. of acetone was added dropwise with stirring a solution of 3.26 g. (0.03 mole) of ethyl chloroformate in 125 ml. of acetone while maintaining the temperature at about −10° C. To the mixture was then added a mixture of 7.75 g. (0.03 mole) of N-[3-(4-carbamyl-1-piperidyl)propyl]amine dihydrochloride and 7.08 g. of triethylamine in 150 ml. of acetone. When addition was complete, the mixture was allowed to stand overnight, and the white solid which separated was filtered off, washed with water, and air dried. The latter was recrystallized from ethanol giving 4.23 g. of N-[3-(4-carbamyl-1-piperidyl)propyl] - N - [β - (3-indolyl)propionyl]amine, M.P. 178.0–179.2° C. (corr.).

N - [3 - (4 - carbamyl-1-piperidyl)propyl]-N-[β-(3-indolyl)propionyl]amine reacts with formic acid, acetic acid, isobutyric acid, alpha-mercaptopropionic acid, malic acid, fumaric acid, succinic acid, succinamic acid, tartaric acid, citric acid, lactic acid, benzoic acid, 4-methoxybenzoic acid, phthalic acid, anthranilic acid, 1-naphthalenecarboxylic acid, cinnamic acid, cyclohexanecarboxylic acid, mandelic acid, tropic acid, crotonic acid, acetylene dicarboxylic acid, sorbic acid, 2-furancarboxylic acid, cholic acid, pyrenecarboxylic acid, 2-pyridinecarboxylic acid, 3-indoleacetic acid, quinic acid, sulfamic acid, methanesulfonic acid, isethionic acid, benzenesulfonic acid, p-toluenesulfonic acid, benzenesulfinic acid, butylarsonic acid, diethylphosphinic acid, p-aminophenylarsinic acid, phenylstibnic acid, phenylphosphinous acid, methylphosphonic acid, phenylphosphinic acid, hydrofluoric acid, hydrochloric acid, hydrobromic acid, hydriodic acid, perchloric acid, nitric acid, sulfuric acid, phosphoric acid, hydrocyanic acid, phosphotungstic acid, molybdic acid, phosphomolybdic acid, pyrophosphoric acid, arsenic acid, picric acid, picrolonic acid, barbituric acid, boron trifluoride, and the like, to give, respectively, the formate, acetate, isobutyrate, alpha-mercaptopropionate, malate (or acid malate), fumarate (or acid fumarate), succinate (or acid succinate), succinamate, tartrate (or bitartrate), citrate (or acid citrate), lactate, benzoate, 4-methoxybenzoate, phthalate (or acid phthalate), anthranilate, 1-naphthalenecarboxylate, cinnamate, cyclohexanecarboxylate, mandelate, tropate, crotonate, acetylene dicarboxylate, sorbate (or acid sorbate), 2-furancarboxylate, cholate, pyrenecarboxylate, 2-pyridinecarboxylate, 3-indoleacetate, quinate, sulfamate, methanesulfonate, isethionate, benzenesulfonate, p-toluenesulfonate, benzenesulfinate, butylarsonate, diethylphosphinate, p-aminophenylarsinate, phenylstibnate, phenylphosphinite, methyl phosphonate, phenylphosphinate, hydrofluoride, hydrochloride, hydrobromide, hydriodide, perchlorate, nitrate, sulfate (or bisulfate), phosphate (or acid phosphate), hydrocyanide, phosphotungstate, molybdate, phosphomolybdate, pyrophosphate, arsenate, picrate, picrolonate, barbiturate and boron trifluoride salts.

N - [3 - 4 - carbamyl-1-piperidyl)propyl]-N-[β-(3-indolyl)propionyl]amine can be reacted with hydriodic acid to form N-[3-(4-carbamyl-1-piperidyl) propyl]-N-[β-(3-indoyl)propionyl]amine hydriodide, useful as a characterizing intermediate.

N - [3 - (4 - carbamyl-1-piperidyl)propyl]-N-[β-(3-indolyl)propionyl]amine, in the form of its hydriodide salt, can be converted to the hydrochloride salt by passing an aqueous solution of the former over an ion-exchange resin saturated with chloride ions, for example, Rohm & Haas' Amberlite ® IRA–400 resin.

N - [3 - (4 - carbamyl-1-piperidyl)propyl]-N-[β-(3-indolyl)propionyl]amine can be reacted with methyl iodide, methyl bromide, ethyl bromide, allyl bromide, benzyl chloride, 2-chlorobenzyl chloride, or methyl p-toluenesulfonate to give the methiodide, methobromide, ethobromide, allobromide, benzochloride, 2-chloro-benzochloride, or metho-6-toluenesulfonate salts, respectively.

The compounds of the following examples were prepared according to the procedure described above in Example 9.

Example 10

(a) β-(1-indolyl)propionic acid was reacted with ethyl chloroformate in acetone in the presence of triethylamine and the resulting mixed anhydride reacted with N-[3-(4-carbamyl-1-piperidyl)propyl]amine in acetone to give N-[3-(4-carbamyl - 1 - piperidyl)propyl]-N-[β-(1-indolyl)propionyl]amine [$Ic$; $R_1$ and $R_3$ are H, $R_4$ is 4-$CONH_2$, Y is $CH_2CH_2$, Y' is $(CH_2)_3$, R is H], M.P. 150.4–151.8° C. (corr.) (recrystallized from isopropanol).

(b) β-(3-indolyl)propionic acid was reacted with isobutyl chloroformate in acetone in the presence of triethylamine and the resulting mixed anhydride reacted with N-{3-[4-(N-methylcarbamyl)-1-piperidyl]propyl}amine to give N-{3-[4-(N-methylcarbamyl)-1-piperidyl]propyl}-N-[β-(3-indolyl)propionyl]amine [$Ia$; $R_1$, $R_2$, and $R_3$ are H, $R_4$ is 4-$CONHCH_3$, Y is $CH_2CH_2$, Y' is $(CH_2)_3$, R is H], M.P. 194.4–195.6° C. (corr.) (recrystallized from an isopropanol-ethyl acetate mixture).

(c) β-(3-indolyl)propionic acid was reacted with ethyl chloroformate in acetone in the presence of triethylamine and the resulting mixed anhydride reacted with N,N-bis-{3-[4-(N-methylcarbamyl)-1-piperidyl]propyl}amine to give N,N-bis-{3-[4-(N-methylcarbamyl)-1-piperidyl]propyl}-N-[β-(3 - indolyl)propionyl]amine [$Ia$; $R_1$, $R_2$, and $R_3$ are H, $R_4$ is 4-$CONHCH_3$, Y is $CH_2CH_2$, Y' is $(CH_2)_3$, R is 4-$CH_3NHCOC_5H_9N$-$(CH_2)_3$-], M.P. 139.2–140.6° C. (corr.) (recrystallized from ethanol).

(d) β-(1-indolyl)propionic acid was reacted with isobutyl chloroformate in acetone in the presence of triethylamine and the resulting mixed anhydride reacted with N,N-bis-{3-[4-(N-methylcarbamyl)-1-piperidyl] propyl}amine to give N,N-bis-{3-[4-(N-methylcarbamyl)-1-piperidyl]propyl}-N-[β-(1-indolyl)-propionyl]amine [$Ic$; $R_1$ and $R_3$ are H, $R_4$ is 4-$CONHCH_3$, Y is $CH_2CH_2$, Y' is $(CH_2)_3$, R is 4-$CH_3NHCOC_5H_9N$-$(CH_2)_3$-], M.P. 117.2–119.0° C. (corr.) (recrystallized from ethyl acetate).

(e) β-(3-indolyl)propionic acid was reacted with ethyl chloroformate in acetone in the presence of triethylamine and the resulting mixed anhydride reacted with N-{3-[4-(N-ethylcarbamyl)-1-piperidyl]propyl}amine to give N-{3-[4-(N-ethylcarbamyl)-1-piperidyl]propyl} - N - [β-(3-indolyl)propionyl]amine [$Ia$; $R_1$, $R_2$, and $R_3$ are H, $R_4$ is 4-$CONHC_2H_5$, Y is $CH_2CH_2$, Y' is $(CH_2)_3$, R is H], M.P. 212.8–213.6° C. (corr.) (recrystallized from ethanol).

(f) β-(1-indolyl)propionic acid was reacted with ethyl chloroformate in acetone in the presence of triethylamine and the resulting mixed anhydride reacted with N-{3-[4-(N-ethylcarbamyl)-1-piperidyl]propyl}amine to give N-{3 - [4-(N-ethylcarbamyl)-1-piperidyl]propyl}-N-[β-(1-indolyl)propionyl]amine [$Ic$; $R_1$ and $R_3$ are H, $R_4$ is 4-$CONHC_2H_5$, Y is $CH_2CH_2$, Y' is $(CH_2)_3$, R is H], M.P. 152.0–152.6° C. (corr.) (recrystallized from ethyl acetate).

(g) β-(3-indolyl)propionic acid was reacted with ethyl chloroformate in acetone in the presence of triethylamine and the resulting mixed anhydride reacted with N,N-bis-{3 - [4 - (N - ethylcarbamyl)-1-piperidyl]propyl}amine to give N,N - bis-{3-[4-(N-ethylcarbamyl)-1-piperidyl]propyl}-N-[β-(3-indolyl)propionyl]amine [$Ia$; $R_1$, $R_2$, and $R_3$ are H, $R_4$ is 4-$CONHC_2H_5$, Y is $CH_2CH_2$, Y' is $(CH_2)_3$, R is 4-$C_2H_5NHCOC_5H_9N$-$(CH_2)_3$-], M.P. 185.6–186.4° C. (corr.) (recrystallized from ethanol).

(h) β-(3-indolyl)propionic acid was reacted with isobutyl chloroformate in acetone in the presence of triethylamine and the resulting mixed anhydride reacted with N-[3-(4-isopropyl-1-piperidyl)propyl]amine to give N-[3-(4 - isopropyl-1-piperidyl)-propyl]-N-[β-(3-indolyl)propionyl]amine [$Ia$; $R_1$, $R_2$, and $R_3$ are H, $R_4$ is

4-$CH(CH_3)_2$

Y is $CH_2CH_2$, Y' is $(CH_2)_3$, R is H], M.P. 168.6–170.8° C. (corr.) (recrystallized from ethyl acetate).

(i) β-(3-indolyl)propionic acid was reacted with isobutyl chloroformate in acetone in the presence of triethylamine and the resulting mixed anhydride reacted with N-[3-(4-cyclohexylmethyl-1-piperidyl)propyl]amine to give N - [3-(4-cyclohexylmethyl-1-piperidyl)propyl]-N-[β-(3-indolyl)propionyl]amine [$Ia$; $R_1$, $R_2$, and $R_3$ are H, $R_4$ is 4-$C_6H_{11}CH_2$, Y is $CH_2CH_2$, Y' is $(CH_2)_3$, R is H], M.P. 141.8–143.8° C. (corr.) (recrystallized from ethyl acetate).

(j) β-(1-indolyl)propionic acid was reacted with isobutyl chloroformate in acetone in the presence of triethylamine and the resulting mixed anhydride reacted with N-[3-(4-cyclohexylmethyl-1-piperidyl)propyl]amine to give N - [3-(4-cyclohexylmethyl-1-piperidyl)propyl]-N-[β-(1-indolyl)propionyl]amine [$Ic$; $R_1$ and $R_3$ are H, $R_4$ is 4-$C_6H_{11}CH_2$, Y is $CH_2CH_2$, Y' is $(CH_2)_3$, R is H], M.P. 92.6–93.6° C. (corr.) (recrystallized from hexane).

(k) β-(3-indolyl)propionic acid was reacted with isobutyl chloroformate in acetone in the presence of triethylamine and the resulting mixed anhydride reacted with N-[3-(4-benzyl-1-piperidyl)propyl]amine to give N - [3 - (4-benzyl-1-piperidyl)-propyl]-N-[β-(3-indolyl)propionyl]amine [$Ia$; $R_1$, $R_2$, and $R_3$ are H, $R_4$ is 4-$C_6H_5CH_2$, Y is $CH_2CH_2$, Y' is $(CH_2)_3$, R is H], M.P. 159.2–160.2° C. (corr.) (recrystallized from ethyl acetate).

(l) β-(1 indolyl)propionic acid was reacted with isobutyl chloroformate in acetone in the presence of triethylamine and the resulting mixed anhydride reacted with N-[3-(4-benzyl-1-piperidyl)propyl]amine to give N-[3-(4 - benzyl - 1-piperidyl)propyl]-N-[3-(1-indolyl)propionyl]amine [$Ic$; $R_1$ and $R_3$ are H, $R_4$ is 4-$C_6H_5CH_2$, Y is $CH_2CH_2$, Y' is $(CH_2)_3$, R is H], M.P. 70.8–72.2° C. (corr.) (recrystallized from hexane).

(m) β-(3-indolyl)propionic acid was reacted with isobutyl chloroformate in acetone in the presence of triethylamine and the resulting mixed anhydride reacted with N - [3 - (3-acetylamino-1-piperidyl)propyl]amine to give N - [3-(3-acetylamino-1-piperidyl)-propyl]-N-[β-(3-indolyl)propionyl]amine [$Ia$; $R_1$, $R_2$, and $R_3$ are H, $R_4$ is 3-$CH_3CONH$, Y is $CH_2CH_2$, Y' is $(CH_2)_3$, R is H], M.P. 139.4–140.6° C. (corr.) (recrystallized from an ethyl acetate-hexane mixture).

(n) β-(3-indolyl)propionic acid was reacted with isobutyl chloroformate in acetone in the presence of triethylamine and the resulting mixed anhydride reacted with N-[3-(4-cyclohexylmethyl-1-piperidyl)propyl]amine to give N-[3-(4-cyclohexylmethyl-1-piperidyl)propyl]-N-[β-(3-indolyl)propionyl]amine [$Ia$; $R_1$, $R_2$, and $R_3$ are H, $R_4$ is 4-$C_6H_{11}CH_2$, Y is $CH_2CH_2$, Y' is $(CH_2)_3$, R is H], M.P. 141.8–143.8° C. (corr.) (recrystallized from ethyl acetate).

(o) β-(3-indolyl)propionic acid was reacted with isobutyl chloroformate in acetone in the presence of triethylamine and the resulting mixed anhydride reacted with N - [4-(4-cyclohexylmethyl-1-piperidyl)butyl]amine to give N-[4-(4-cyclohexylmethyl-1-piperidyl)butyl]-N-[β-(3-indolyl)propionyl]amine [$Ia$; $R_1$, $R_2$, and $R_3$ are H, $R_4$ is 4-$C_6H_{11}CH_2$, Y is $CH_2CH_2$, Y' is $(CH_2)_4$, R is H], M.P. 101.0–102.0° C. (corr.) (recrystallized from an ethyl acetate-hexane mixture).

(p) β-(3-indolyl)propionic acid was reacted with isobutyl chloroformate in acetone in the presence of triethylamine, the resulting mixed anhydride reacted with N - [6-(4-cyclohexylmethyl-1-piperidyl)hexyl]amine and the product reacted with ethanolic hydrogen chloride to give N - [6-(4-cyclohexylmethyl-1-piperidyl)-hexyl]-N-[β - (3 - indolyl)propionyl]amine hydrochloride [I$a$; $R_1$, $R_2$, and $R_3$ are H, $R_4$ is 4-C$_6$H$_{11}$CH$_2$, Y is CH$_2$CH$_2$, Y' is (CH$_2$)$_6$, R is H], M.P. 164.6–179.8° C. (corr.) (recrystallized from an ethanol-ether mixture).

(q) γ-(3-indolyl)butyric acid was reacted with isobutyl chloroformate in acetone in the presence of triethylamine and the resulting mixed anhydride reacted with N-[3-(4-cyclohexylmethyl-1-piperidyl)propyl]amine to give N-[3-(4 - cyclohexylmethyl-1-piperidyl)propyl]-N-[γ-(3-indolyl)butyryl]amine [I$a$; $R_1$, $R_2$, and $R_3$ are H, $R_4$ is 4-C$_6$H$_{11}$CH$_2$, Y and Y' are (CH$_2$)$_3$, R is H], M.P. 130.0–131.6° C. (corr.) (recrystallized from an ethyl acetate-hexane mixture).

Examples 11(a–r)

By following the manipulative procedure described above in Example 9, substituting for the N-[3-(4-carbamyl-1-piperidyl)propyl]amine and the β-(3-indolyl)propionic acid used therein molar equivalent amounts of an appropriate N-mono-[(substituted-1-piperidyl)lower - alkyl] amine and an appropriate substituted-(2- or 1-indolyl) lower-alkanoic acid, there can be obtained the compounds of Formula I$b$ or I$c$ listed below in Table A, where R, in each case, is H.

TABLE A

| Ex. | Formula | $R_1/R_2$ | $R_3/R_4$ | Y/Y' |
|---|---|---|---|---|
| 11(a) | I$b$ | 6—CH$_3$O / H | / 4—HO | CH$_2$ / (CH$_2$)$_3$ |
| 11(b) | I$b$ | 5,6-di-CH$_3$O / H | / 4—HO | CH$_2$CH$_2$ / (CH$_2$)$_3$ |
| 11(c) | I$b$ | 6—CH$_3$S / H | / 4—CH$_2$CH$_2$CH$_2$OH | (CH$_2$)$_3$ / (CH$_2$)$_3$ |
| 11(d) | I$b$ | 6—CH$_3$SO$_2$ / H | / 4—HCOO | (CH$_2$)$_4$ / (CH$_2$)$_3$ |
| 11(e) | I$b$ | 6—HO / H | / 4—(CH$_2$)$_3$OCOC$_3$H$_7$ | (CH$_2$)$_6$ / (CH$_2$)$_3$ |
| 11(f) | I$b$ | 5,6—OCH$_2$O / H | / 4—C$_6$H$_5$COO | CH$_2$CH$_2$ / (CH$_2$)$_3$ |
| 11(g) | I$b$ | 6—C$_5$H$_6$CH$_2$O / CH$_3$ | / 4—CH(CH$_3$)$_2$ | CH$_2$CH$_2$ / (CH$_2$)$_3$ |
| 11(h) | I$b$ | 5—Cl / C$_6$H$_5$CH$_2$ | 4—C$_6$H$_5$CH$_2$ | CH$_2$CH$_2$ / (CH$_2$)$_3$ |
| 11(i) | I$b$ | H / C$_6$H$_5$CH$_2$CH$_2$ | 4—CH$_3$CONH | CH$_2$CH$_2$ / (CH$_2$)$_3$ |
| 11(j) | I$c$ | H / — | CH$_3$ / 4—CONH$_2$ | CH$_2$CH$_2$ / CH$_2$CH$_2$ |
| 11(k) | I$c$ | H / — | C$_6$H$_5$ / 4—CONH$_2$ | (CH$_2$)$_4$ / (CH$_2$)$_3$ |
| 11(l) | I$c$ | H / — | 4—CH$_3$OC$_6$H$_4$ / 4—CONH$_2$ | (CH$_2$)$_6$ / (CH$_2$)$_3$ |
| 11(m) | I$c$ | H / — | H / 4—CONH$_2$ | CH$_2$CH$_2$ / (CH$_2$)$_3$ |
| 11(n) | I$c$ | H / — | H / 4—CON(C$_2$H$_5$)$_2$ | CH$_2$CH$_2$ / (CH$_2$)$_3$ |
| 11(o) | I$c$ | H / — | H / 4—CON(CH$_3$)$_2$ | CH$_2$CH$_2$ / (CH$_2$)$_3$ |
| 11(p) | I$c$ | H / — | H / 4—C$_6$H$_{11}$CH$_2$ | (CH$_2$)$_2$ / (CH$_2$)$_3$ |
| 11(q) | I$c$ | H / — | H / 4—C$_3$H$_5$CH$_2$ | (CH$_2$)$_2$ / (CH$_2$)$_3$ |
| 1(r) | I$c$ | H / — | H / 4—CONH$_2$ | (CH$_2$)$_2$ / (CH$_2$)$_6$ |

Example 12

N,N - bis-{3-[4-(N-ethylcarbamyl-1-piperidyl]propyl}-N-[3-(1-indolyl)propyl]amine [II$c$; $R_1$ and $R_3$ are H, $R_4$ is 4-CONHC$_2$H$_5$, Y' and Y" are (CH$_2$)$_3$, R is

4-C$_2$H$_5$NHCOC$_5$H$_9$N—(CH$_2$)$_3$—]

A mixture of 3.88 g. (0.02 mole) of 3-(1-indolyl)-propyl chloride, 9.02 g. (0.02 mole) of N,N-bis-{3-[4-(N-ethylcarbamyl)-1-piperidyl]propyl}amine, and 3.3 g. (0.04 mole) of sodium bicarbonate and 275 ml. of acetonitrile was heated under reflux for forty-eight hours, allowed to cool and the mixture filtered to remove the solid which had separated. The filtrate was evaporated to dryness in vacuo and the residual oil taken into ethyl acetate, washed with cold water and then extracted with dilute aqueous methanesulfonic acid. The acid extracts were filtered, basified with concentrated ammonium hydroxide and semi-saturated with solid potassium carbonate. The oil which separated solidified on standing for several days and was collected and recrystallized from an ethyl acetate-hexane mixture giving 3.26 g. of N,N-bis-{3-[4-(N-ethylcarbamyl) - 1 - piperidyl]propyl} - N - [3-(1-indolyl)propyl] amine, M.P. 91.6–93.2° C. (corr.).

Example 13

N,N - bis-{3-[4-(N-ethylcarbamyl)-1-piperidyl]propyl}-N-[2-(3-indolyl)ethyl]amine [II$a$; $R_1$, $R_2$, and $R_3$ are H, $R_4$ is 4-CONHC$_2$H$_5$, Y' is (CH$_2$)$_3$, Y" is CH$_2$CH$_2$, R is 4-C$_2$H$_5$NHCOC$_5$H$_9$N—(CH$_2$)$_3$—] was prepared according to the procedure described above in Example 12. 2-(3-indolyl)ethyl bromide was reacted with a molar excess of N,N - bis - {3-[4 - (N-ethylcarbamyl)-1-piperidyl]propyl} amine in acetonitrile to give N,N-bis-{3-[4-(N-ethylcarbamyl) - 1-piperidyl]-propyl}-N-[2-(3-indolyl)ethyl]amine, M.P. 150.4–152.8° C. (corr.) (recrystallized from isopropanol).

Examples 14(a–w)

By following the manipulative procedure described above in Example 12, substituting for the 3-(1-indolyl) propyl chloride and the N,N-bis-{3-[4-(N-ethylcarbamyl)-1-piperidyl]propyl}amine used therein molar equivalent amounts of an appropriate N-mono-[(substituted-1-piperidyl)lower-alkyl]amine and an appropriate substituted-(3-, 2-, or 1-indolyl)lower-alkyl halide, there can be obtained the compounds of Formulas II$a$, $b$, and $c$ listed below in Table B, where R in each case, is H.

TABLE B

| Ex. | Formula | $R_1/R_2$ | $R_3/R_4$ | Y'/Y" |
|---|---|---|---|---|
| 14(a) | II$a$ | 6—CH$_3$O / H | H / 4—OH | (CH$_2$)$_3$ / CH$_2$CH$_2$ |
| 14(b) | II$a$ | 5,6-di-CH$_3$O / H | H / 4—OH | (CH$_2$)$_3$ / (CH$_2$)$_3$ |
| 14(c) | II$a$ | 6—CH$_3$S / H | H / 4—CH$_2$CH$_2$CH$_2$OH | (CH$_2$)$_3$ / CH$_2$CH$_2$ |
| 14(d) | II$a$ | 6—CH$_3$SO$_2$ / H | H / 4—HCOO | (CH$_2$)$_3$ / (CH$_2$)$_5$ |
| 14(e) | II$a$ | 6—HO / H | H / 4—(CH$_2$)$_3$OCOC$_3$H$_7$ | (CH$_2$)$_3$ / (CH$_2$)$_7$ |
| 14(f) | II$a$ | 5,6—OCH$_2$O / H | H / 4—C$_6$H$_5$COO | (CH$_2$)$_3$ / CH$_2$CH$_2$ |
| 14(g) | II$a$ | 6—C$_6$H$_5$CH$_2$O / H | H / 4—CONH$_2$ | (CH$_2$)$_3$ / CH$_2$CH$_2$ |
| 14(h) | II$a$ | 5—Cl / H | H / 4—CONH$_2$ | (CH$_2$)$_4$ / (CH$_2$)$_4$ |
| 14(i) | II$b$ | H / CH$_3$ | H / 4—CONHCH$_3$ | (CH$_2$)$_3$ / CH$_2$CH$_2$ |
| 14(j) | II$b$ | H / C$_6$H$_5$CH$_2$ | H / 4—CON(CH$_3$)$_2$ | (CH$_2$)$_3$ / (CH$_2$)$_4$ |
| 14(k) | II$b$ | H / C$_6$H$_5$CH$_2$CH$_2$ | H / 4—CON(CH$_3$)$_2$ | (CH$_2$)$_3$ / (CH$_2$)$_6$ |
| 14(l) | II$c$ | H / — | CH$_3$ / 4—CH(CH$_3$)$_2$ | (CH$_2$)$_3$ / CH$_2$CH$_2$ |
| 14(m) | II$c$ | H / — | C$_6$H$_5$ / 4—C$_6$H$_5$CH$_2$ | (CH$_2$)$_3$ / CH$_2$CH$_2$ |
| 14(n) | II$c$ | H / — | 4—CH$_3$OC$_6$H$_4$ / 4—CH$_3$CONH | (CH$_2$)$_3$ / (CH$_2$)$_4$ |
| 14(o) | II$c$ | H / — | H / 4—C$_6$H$_{11}$CH$_2$ | (CH$_2$)$_3$ / (CH$_2$)$_7$ |
| 14(p) | II$c$ | H / — | H / 4—C$_3$H$_5$CH$_2$ | (CH$_2$)$_3$ / (CH$_2$)$_3$ |
| 14(q) | II$c$ | H / — | H / 4—CONH$_2$ | (CH$_2$)$_3$ / (CH$_2$)$_6$ |
| 14(r) | II$a$ | H / — | 3—CH$_3$CONHC$_6$H$_4$CH$_2$ | (CH$_2$)$_7$ / (CH$_2$)$_3$ |
| 14(s) | II$a$ | H / — | 4—CH$_3$C$_6$H$_4$COOCH$_2$CH$_2$ / 4—CH$_3$SC$_6$H$_4$CH$_2$ | (CH$_2$)$_3$ / (CH$_2$)$_3$ |
| 14(t) | II$a$ | H / — | 4—C$_6$H$_{11}$CH$_2$ / 4—CH$_3$SOC$_6$H$_4$CH$_2$ | (CH$_2$)$_3$ / (CH$_2$)$_3$ |
| 14(u) | II$a$ | H / — | 4—C$_6$H$_{11}$CH$_2$ / 4—CH$_3$SO$_2$C$_6$H$_4$CH$_2$ | (CH$_2$)$_3$ / (CH$_2$)$_3$ |
| 14(v) | II$a$ | H / — | H / 4—CONHCH$_2$CH=CH$_2$ | (CH$_2$)$_3$ / (CH$_2$)$_3$ |
| 14(w) | II$a$ | H / — | H / 4—CON(CH$_2$CH=CH$_2$)$_2$ | (CH$_2$)$_3$ / (CH$_2$)$_3$ |

Example 15

N - [3 - (4-cyclohexylmethyl-1-piperidyl)propyl]-N-[3-(1-indolyl)-propyl]amine dihydrochloride [II$c$; $R_1$, $R_3$, and R are H, $R_4$ is 4-C$_6$H$_{11}$CH$_2$, Y' and Y" are (CH$_2$)$_3$].

A solution of about 22 g. (0.05 mole) of N-[3-(4-cyclohexylmethyl - 1 - piperidyl)propyl]-N-[β-(1-indolyl)propionyl]amine in 300 ml. of dry tetrahydrofuran was added slowly with stirring to a mixture of 4.0 g. (0.10 mole) of lithium aluminum hydride in 380 ml. of dry tetrahydrofuran. When addition was complete, the mixture was heated under reflux for six and a half hours, then cooled and decomposed by the dropwise addition of 10 ml. of water in 50 ml. of tetrahydrofuran. Filtration of the reaction mixture and evaporation of the filtrate to dryness afforded a viscous oil which was distilled in vacuo at 0.001 mm. The fraction boiling at 195–213° C. was collected as product, dissolved in ether and converted to the hydrochloride salt by addition of excess ethanolic hydrogen chloride. The solid which separated was collected and recrystallized from ethanol to give 7.36 g. of N-[3-(4-cyclohexylmethyl - 1 - piperidyl)propyl] - N-[3-(1-indolyl)propyl]amine dihydrochloride, M.P. 262.0–264.0° C. (corr.).

Example 16

(a) N - [3-(4-cyclohexylmethyl-1-piperidyl)propyl]-N-[β-(3-indolyl)propionyl]amine was similarly reduced with lithium aluminum hydride in dry tetrahydrofuran to give N-[3-(4-cyclohexylmethyl - 1 - piperidyl)propyl]-N-[3-(3-indolyl)propyl]amine [IIa; $R_1$, $R_2$, $R_3$, and R are H, $R_4$ is 4-$C_6H_{11}CH_2$, Y' and Y" are $(CH_2)_3$], M.P. 98.8–101.2° C. (corr.) (recrystallized from an ethyl acetate-hexane mixture).

(b) N - [4 - (4-cyclohexylmethyl-1-piperidyl)butyl]-N-[β-(3-indolyl)propionyl]amine was similarly reduced with lithium aluminum hydride in dry tetrahydrofuran to give N-[4-(4-cyclohexylmethyl - 1 - piperidyl)butyl]-N-[3-(3-indolyl)propyl]amine [IIa; $R_1$, $R_2$, $R_3$, and R are H, $R_4$ is 4-$C_6H_{11}CH_2$, Y' is $(CH_2)_4$, Y" is $(CH_2)_3$], M.P. 61.6–63.4° C. (corr.) (recrystallized from hexane).

(c) N - [6 - (4-cyclohexylmethyl-1-piperidyl)hexyl]-N-[β-(3-indolyl)propionyl]amine was similarly reduced with lithium aluminum hydride in dry tetrahydrofuran to give N - [6 - (4-cyclohexylmethyl-1-piperidyl)hexyl]-N-[3-(3-indolyl)propyl]amine [IIa; $R_1$, $R_2$, $R_3$, and R are H, $R_4$ is 4-$C_6H_{11}CH_2$, Y' is $(CH_2)_6$, Y" is $(CH_2)_3$], M.P. 70.6–74.6° C. (corr.) (recrystallized from an ethyl acetate-hexane mixture).

(d) N - [3-(4-cyclohexylmethyl-1-piperidyl)propyl]-N-[γ-(3-indolyl)butyryl]amine was similarly reduced with lithium aluminum hydride in dry tetrahydrofuran to give N-[3-(4-cyclohexylmethyl - 1 - piperidyl)propyl]-N-[4-(3-indolyl)butyl]amine [IIa; $R_1$, $R_2$, $R_3$, and R are H, $R_4$ is 4-$C_6H_{11}CH_2$, Y' is $(CH_2)_3$, Y" is $(CH_2)_4$], M.P. 65.4–78.0° C. (corr.) (recrystallized from hexane).

Example 17

N - acetyl - N-[3-(4-cyclohexylmethyl-1-piperidyl)propyl]-N-[3-(3-indolyl)propyl]amine [IIa; $R_1$, $R_2$, and $R_3$ are H, $R_4$ is 4-$C_6H_{11}CH_2$, R is $CH_3CO$, Y' and Y" are $(CH_2)_3$].

A solution of 5.35 g. (0.013 mole) of N-[3-(4-cyclohexylmethyl - 1 - piperidyl)propyl]-N-[3-(3-indolyl)propyl]amine and 1.73 g. (0.017 mole) of acetic anhydride in 150 ml. of benzene was heated under reflux for five hours, cooled to room temperature, washed twice with 5% aqueous sodium carbonate, twice with water, dried and taken to dryness. Recrystallization of the residue from hexane afforded 3.65 g. of N-acetyl-N-[3-(4-cyclohexylmethyl-1 - piperidyl)propyl]-N-[3-(3-indolyl)propyl]amine, M.P. 91.2–92.0° C. (corr.).

Example 18

Using a procedure similar to that described in Example 17, there was obtained:

(a) N-acetyl-N-[6-(4 - cyclohexylmethyl - 1 - piperidyl)hexyl]-N-[3-(3-indolyl)propyl]amine [IIa; $R_1$, $R_2$, and $R_3$ are H, $R_4$ is 4-$C_6H_{11}CH_2$, R is $CH_3CO$, Y' is $(CH_2)_6$, Y" is $(CH_2)_3$], M.P. 93.0–95.6° C. (corr.) (recrystallized from hexane) from N-[6-(4-cyclohexylmethyl-1-piperidyl)hexyl]-N-[3-(3-indolyl)-propyl]amine and acetic anhydride;

(b) N - succinoyl - N - [6-(4-cyclohexylmethyl-1-piperidyl)hexyl]-N-[3-(3-indolyl)propyl]amine [IIa; $R_1$, $R_2$, and $R_3$ are H, $R_4$ is 4-$C_6H_{11}CH_2$, R is $HOOCCH_2CH_2CO$, Y' is $(CH_2)_6$, Y" is $(CH_2)_3$], M.P. 174.0–181.0° C. (corr.) (recrystallized from benzene) from N-[6-(4-cyclohexylmethyl - 1 - piperidyl)hexyl] - N-[3-(3-indolyl)-propyl]amine and succinic anhydride; and (c) N-formyl-N-[3-(4-cyclohexylmethyl - 1 - piperidyl)propyl]-N-[3-(3-indolyl)propyl]amine [IIa; $R_1$, $R_2$, and $R_3$ are H, $R_4$ is 4-$C_6H_{11}CH_2$, R is HCO, Y' and Y" are $(CH_2)_3$], M.P. 85.0–88.0° C. (corr.) (recrystallized from hexane) from N-[3-(4-cyclohexylmethyl-1-piperidyl)propyl] - N-[3-(3-indolyl)propyl]amine and a mixture of formic acid and acetic anhydride.

Example 19

N-benzoyl-N-[3-(4-cyclohexylmethyl - 1 - piperidyl)propyl]-N-[3-(3-indolyl)propyl]amine [IIa; $R_1$, $R_2$, and $R_3$ are H, $R_4$ is 4-$C_6H_{11}CH_2$, R is $C_6H_5CO$, Y' and Y" are $(CH_2)_3$].

A solution of 11.88 g. (0.03 mole) of N-[3-(4-cyclohexylmethyl - 1 - piperidyl)propyl]-N-[3-(3-indolyl)propyl]amine, 5.62 g. (0.04 mole) of benzoyl chloride, and 8.1 g. (0.08 mole) of triethylamine in 200 ml. of benzene was heated under reflux for five hours, allowed to cool to room temperature, and filtered. The filtrate was washed twice with aqueous sodium carbonate, twice with water, dried, and taken to dryness. Recrystallization of the residue from an ethyl acetate-hexane mixture afforded 4.91 g. of N-benzoyl-N-[3-(4-cyclohexylmethyl-1 - piperidyl)propyl] - N - [3 - (3-indolyl)propyl]amine, M.P. 119.4–121.4° C. (corr.).

Example 20

Using a procedure similar to that described in Example 19, there was obtained:

(a) N-benzoyl - N - [6 - (4 - cyclohexylmethyl - 1 - piperidyl)hexyl] - N - [3 - (3 - indolyl)propyl]amine hydrochloride [IIa; $R_1$, $R_2$, and $R_3$ are H, $R_4$ is

4-$C_6H_{11}CH_2$

R is $C_6H_5CO$, Y' is $(CH_2)_6$, Y" is $(CH_2)_3$], M.P. 113.0–119.0° C. (corr.) (recrystallized from ethanol-ether) from N - [6 - (4 - cyclohexylmethyl - 1 - piperidyl)hexyl]-N-[3-(3-indolyl)-propyl]amine and benzoyl chloride;

(b) N - (4 - trifluoromethylbenzoyl) - N - [6 - (4-cyclohexylmethyl - 1 - piperidyl)hexyl] - N - [3 - (3-indolyl)propyl]amine [IIa; $R_1$, $R_2$, and $R_3$ are H, $R_4$ is 4-$C_6H_{11}CH_2$, R is 4-$CF_3C_6H_4CO$, Y' is $(CH_2)_6$, Y" is $(CH_2)_3$] from N - [6 - (4 - cyclohexylmethyl - 1 - piperidyl)hexyl]-N-[3-(3-indolyl)propyl]amine and 4-trifluoromethylbenzoyl chloride;

c) N - cyclohexylcarbonyl - N - [6 - (4 - cyclohexylmethyl - 1 - piperidyl)hexyl] - N - [3 - (3 - indolyl)-propyl]amine [IIa; $R_1$, $R_2$, and $R_3$ are H, $R_4$ is

4-$C_6H_{11}CH_2$

R is $C_6H_{11}CO$, Y' is $(CH_2)_6$, Y" is $(CH_2)_3$], M.P. 117–119° C. (uncorr.) (recrystallized from the ethyl acetate-hexane mixture) from N-[-(4-cyclohexylmethyl-1-piperidyl)-hexyl]-N-[3-(3-indolyl)propyl]amine and cyclohexylcarbonyl chloride;

(d) N - cyclohexylcarbonyl - N - [3 - (4 - cyclohexylmethyl - 1 - piperidyl)propyl] - N - [3 -(3 - indolyl)-propyl]amine [IIa; $R_1$, $R_2$, and $R_3$ are H, $R_4$ is

4-$C_6H_{11}CH_2$

R is $C_6H_{11}CO$, Y' and Y" are $(CH_2)_3$], M.P. 105.0–109.4° C. (corr.) (recrystallized from an ethyl ectate-hexane mixture) from N-[3-(4-cyclohexylmethyl-1-piperidyl)propyl]-N-[3-(3-indolyl)propyl]amine and cyclohexylcarbonyl chloride;

(e) N - (3,4 - dichlorobenzoyl) - N - [3 - (4 - cyclohexylmethyl - 1 - piperidyl)propyl] - N - [3 - (3 - indolyl)-propyl]amine [IIa; $R_1$, $R_2$, and $R_3$ are H, $R_4$ is

4-$C_6H_{11}CH_2$

R is 3,4-$Cl_2C_6H_3CO$, Y' and Y" are $(CH_2)_3$], M.P. 100.0–101.8° C. (corr.) (recrystallized from an ethyl acetate-hexane mixture) from N-[3-(4-cyclohexylmethyl-1-piperidyl)propyl]-N-[3-(3-indolyl)propyl]amine and 3,4-dichlorobenzoyl chloride;

(f) N - (3,4 - dichlorobenzoyl) - N - [6 - (4 - cyclohexylmethyl - 1 - piperidyl)hexyl] - N - [3 - (3 - indolyl)propyl]amine [IIa; $R_1$, $R_2$, and $R_3$ are H, $R_4$ is

4-$C_6H_{11}CH_2$

R is 3,4-$Cl_2C_6H_3CO$, Y' is $(CH_2)_6$, Y" is $(CH_2)_3$], M.P. 86.6–91.8° C. (corr.) (recrystallized from hexane) from N - [6 - (4 - cyclohexylmethyl - 1 - piperidyl)hexyl]-N[3-(3-indolyl)propyl]amine and 3,4-dichlorobenzoyl chloride;

(g) N - (4 - nitrobenzoyl) - N - [3 - (4- cyclohexylmethyl - 1 - piperidyl)propyl] - N - [3 - (3 - indolyl)propyl]amine [IIa; $R_1$, $R_2$, and $R_3$ are H, $R_4$ is

4-$C_6H_{11}CH_2$

R is 4-$NO_2C_6H_4CO$, Y' and Y" are $(CH_2)_3$], M.P. 128.0–132.0° C. (corr.) (recrystallized from an ethyl acetate-hexane mixture) from N-[3-(4-cyclohexylmethyl-1-piperidyl)propyl] - N - [3 - (3 - indolyl)propyl]amine and 4-nitrobenzoyl chloride;

(h) N-(4-nitrobenzoyl)-N-[6-(4-cyclohexylmethyl-1-piperidyl)hexyl]N-[3-(3-indolyl)propyl]amine [IIa; $R_1$, $R_2$, and $R_3$ are H, $R_4$ is 4-$C_6H_{11}CH_2$, R is 4-$NO_2C_6H_4CO$, Y' is $(CH_2)_6$, Y" is $(CH_2)_3$], M.P. 118.2–120.° C. (corr.) (recrystallized from an ethyl acetate-hexane mixture) from N-[6-(4-cyclohexylmethyl-1-piperidyl)hexyl]-N-[3-(3-indolyl)propyl]amine and 4-nitrobenzoyl chloride;

(i) N-(4-methoxybenzoyl)-N-[3-(4-cyclohexyl-1-piperidyl)hexyl]-N-[3-(3-indolyl)propyl] amine [IIa; $R_1$, $R_2$, and $R_3$ are H, $R_4$ is 4-$C_6H_{11}CH_2$, R is 4-$CH_3OC_6H_4CO$, Y' and Y" are $(CH_2)_3$], M.P. 125.0–128.0° C. (uncorr.) (recrystallized from a benzene-hexane mixture) from N-[3 - (4 - cyclohexylmethyl - 1 - piperidyl)propyl] - N-[3-(3-indolyl)propyl]amine and 4-methoxybenzoyl chloride;

(j) N-cinnamoyl-N-[3-(4-cyclohexylmethyl-1-piperidyl)propyl]-N-[3-(3-indolyl)propyl]amine [IIa; $R_1$, $R_2$, and $R_3$ are H, $R_4$ is 4-$C_6H_{11}CH_2$, R is $C_6H_5CH=CHCO$, Y' and Y" are $(CH_2)_3$], M.P. 105.6–108.0 C°. (corr.) recrystallized from an ethyl acetate-hexane mixture) from N - [3 - (4 - cyclohexylmethyl - 1 - piperidyl)propyl]-N-[3-(3-indolyl)propyl]amine and cinnamoyl chloride;

(k) N-cinnamoyl-N-[6-(4-cyclohexylmethyl-1-piperidyl)hexyl]-N-[3-(3-indolyl)propyl]amine [IIa; $R_1$, $R_2$, and $R_3$ are H, $R_4$ is 4-$C_6H_{11}CH_2$, R is $C_6H_5CH=CHCO$, Y' is $(CH_2)_6$, Y" is $(CH_2)_3$], M.P. 102.4–103.8° C. (corr.) (recrystallized from an ethyl acetate-hexane mixture) from N-[6-(4-cyclohexylmethyl-1-piperidyl)hexyl]-N-[3-(3-indolyl)propyl]amine;

(l) N-(4-nitrocinnamoyl)-N-[3-(4-cyclohexylmethyl-1-piperidyl)propyl]-N-[3-(3-indolyl)propyl]amine [IIa, $R_1$, $R_2$ and $R_3$ are H, $R_4$ is 4-$C_6H_{11}CH_2$, R is

4-$NO_2C_6H_4CH=CHCO$

Y' and Y" are $(CH_2)_3$], M.P. 102.8–107.0° C. (corr.) (recrystallized from a benzene-hexane mixture) from N-[3 - (4 - cyclohexylmethyl - 1 - piperidyl)propyl] - N-[3-(3-indolyl)propyl]amine and 4-nitrocinnamoyl chloride;

(m) N-(4-nitrocinnamoyl)-N-[6-(4-cyclohexylmethyl-1-piperidyl)hexyl]-N-[3-(3-indolyl)propyl]amine [IIa; $R_1$, $R_2$, and $R_3$ are H, $R_4$ is 4-$C_6H_{11}CH_2$, R is

4-$NO_2C_6H_4CH=CHCO$

Y' is $(CH_2)_6$, Y" is $(CH_2)_3$], M.P. 105.0–109.0° C. (corr.) (recrystallized from an ethyl acetate-hexane mixture) from N-[6-(4-cyclohexylmethyl-1-piperidyl)hexyl]-N-[3-(3-indolyl)propyl]amine and 4-nitrocinnamoyl chloride;

(n) N-(4-pyridinecarbonyl)-N-[3-(4-cyclohexylmethyl-1-piperidyl)propyl]-N-[3-(3-indolyl)propyl]amine [IIa; $R_1$, $R_2$ and $R_3$ are H, $R_4$ is 4-$C_6H_{11}CH_2$, R is

4-$C_5H_4NCO$

Y' and Y" are $(CH_2)_3$], M.P. 77.8–86.0° C. (corr.) (recrystallized from an ethyl acetate-hexane mixture) from N - [3 - (4 - cyclohexylmethyl - 1 - piperidyl)propyl]-N-[3-(3-indolyl)propyl]amine and 4-pyridinecarbonyl chloride;

(o) N-(4-pyridinecarbonyl)-N-[6-(4-cyclohexylmethyl-1-piperidyl)hexyl]-N-[3-(3-indolyl)propyl]amine [IIa; $R_1$, $R_2$, and $R_3$ are H, $R_4$ is 4-$C_6H_{11}CH_2$, R is 4-$C_5H_4NCO$, Y' is $(CH_2)_6$, Y" is $(CH_2)_3$], M.P. 105.4–107.2° C. (corr.) (recrystallized from an ethyl acetate-hexane mixture) from N-[6-(4-cyclohexylmethyl-1-piperidyl)hexyl]-N-[3-(indolyl)propyl]amine and 4-pyridinecarbonyl chloride;

(p) N-phenoxyacetyl - N - [3-(4-cyclohexylmethyl-1-piperidyl)propyl]-N-[3-(3-indolyl)propyl]amine [IIa; $R_1$, $R_2$, and $R_3$ are H, $R_4$ is 4-$C_6H_{11}CH_2$, R is

4-$C_6H_5OCH_2CO$

Y' and Y" are $(CH_2)_3$], M.P. 91.0–99.0° C. (corr.) (recrystallized from an ethyl acetate-hexane mixture) from N-[3-(4-cyclohexylmethyl - 1 - piperidyl)propyl]-N-[3-(3-indolyl)propyl]amine and phenoxyacetyl chloride;

(q) N-phenoxyacetyl - N - [6-(4-cyclohexylmethyl-1-piperidyl)hexyl] - N - [3-(3-indolyl)propyl]amine [IIa; $R_1$, $R_2$, and $R_3$ are H, $R_4$ is 4-$C_6H_{11}CH_2$, R is $C_6H_5OCH_2CO$ Y' is $(CH_2)_6$, Y" is $(CH_2)_3$], M.P. 81.8–82.4° C. (corr.) (recrystallized from benzene) from N-[6-(4-cyclohexylmethyl-1-piperidyl)hexyl] - N - [3-(3-indolyl)propyl]amine and phenoxyacetyl chloride; and (r) N-cyclopropylcarbonyl-N-[3-(4-cyclohexylmethyl-1-piperidyl)propyl]-N-[3-(3-indolyl)propyl]amine [IIa; $R_1$, $R_2$, and $R_3$ are H, $R_4$ is 4-$C_6H_{11}CH_2$, R is $C_3H_5CO$, Y' and Y" are $(CH_2)_3$], M.P. 62.0–70.2° C. (corr.) (recrystallized from an ethyl acetate-hexane mixture) from N-[3-(4-cyclohexylmethyl - 1 - piperidyl)propyl]-N-[3-(3-indolyl)propyl]amine and cyclopropylcarbonyl chloride.

Example 21

N - ethyl - N - [6 - (4 - cyclohexylmethyl - 1 - piperidyl))hexyl]-N-[3-(3 - indolyl)propyl]amine dihydrochloride [IIa; $R_1$, $R_2$, and $R_3$ are H, $R_4$ is 4-$C_6H_{11}CH_2$, R is $C_2H_5$, Y' is $(CH_2)_6$, Y" is $(CH_2)_3$].

A solution of 5.75 g. (0.01 mole) of N-acetyl-N-[6-(4-cyclohexylmethyl - 1 - piperidyl)hexyl] - N - [3 - (3 - indolyl)propyl]amine in 175 ml. of dry tetrahydrofuran was added dropwise with stirring to a slurry of 0.94 g. (0.02 mole of lithium aluminum hydride in 175 ml. of dry tetrahydrofuran and then heated under reflux for ten hours. The mixture was then decomposed by the dropwise addition of 2 ml. of water in 25 ml. of tetrahydrofuran, stirred for fifteen minutes, filtered, and the filtrate taken to dryness in vacuo. The residual oil was taken into ether and the solution acidified with excess ethanolic hydrogen chloride. Recrystallization of the solid which separated from an ethanol-acetone mixture afforded 3.09 g. of N-ethyl-N-[6-(4-cyclohexylmethyl-1-piperidyl)hexyl]-N-[3-(3-indolyl)propyl]amine dihydrochloride, M.P. 184.8–188.6° C. (corr.)

Example 22

Using a procedure similar to that described in Example 21, there was obtained:

(a) N - (4 - hydroxybutyl) - N - [3 - (4 - cyclohexylmethyl - 1 - piperidyl)propyl] - N - [3 - (3 - indolyl)propyl]amine [IIa; $R_1$, $R_2$, and $R_3$ are H, $R_4$ is 4-$C_6H_{11}CH_2$, R is $HO(CH_2)_4$, Y' and Y" are $(CH_2)_3$], M.P. 108.0–109.6° C. (corr.) (recrystallized from hexane) by lithium aluminum hydride reduction of N-succinoyl-N-[3-(4-cyclohexylmethyl - 1 - piperidyl)propyl] - N - [3 - (3 - indolyl)-propyl]amine;

(b) N - benzyl - N - [3 - (4 - cyclohexylmethyl - 1 - piperidyl)propyl]-N-[3-(3-indolyl)propyl]amine [IIa; $R_1$, $R_2$, and $R_3$ are H, $R_4$ is 4-$C_6H_{11}CH_2$, R is $C_6H_5CH_2$, Y' and Y'' are (CH₂)₃], M.P. 61.8–63.0° C. (corr.) (recrystallized from hexane) by lithium aluminum hydride reduction of N-benzoyl-N-[3-(4-cyclohexylmethyl-1-piperidyl)propyl]-N-[3-(3-indolyl)propyl]amine;

(c) N - benzyl - N - [6 - (4 - cyclohexylmethyl - 1 - piperidyl)hexyl] - N - [3 - (3 - indolyl)propyl]amine dihydrochloride [IIa; R₁, R₂, and R₃ are H, R₄ is

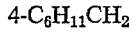

R is C₆H₅CH₂, Y' is (CH₂)₆, Y'' is (CH₂)₃], M.P. 208.5–212.0 C. (corr.) (recrystallized from an ethanol-acetone mixture) by lithium aluminum hydride reduction of N-benzoyl-N-[6-(4-cyclohexylmethyl-1-piperidyl)hexyl] - N - [3-(3-indolyl)propyl]amine;

(d) N - (4 - trifluoromethylbenzyl) - N - [6 - (4 - cyclohexylmethyl - 1 - piperidyl)hexyl] - N - [3 - (3 - indolyl)propyl]amine dihydrochloride [IIa; R₁, R₂, and R₃ are H, R₄ is 4-C₆H₁₁CH₂, R is 4-CF₃C₆H₄CH₂, Y' is (CH₂)₆, Y'' is (CH₂)₃], M.P. 197.0–198.8° C. (corr.) (recrystallized from an ethanol-ether mixture) by lithium aluminum hydride reduction of N-(4-trifluoromethylbenzyl) - N - [6 - (4 - cyclohexylmethyl - 1 - piperidyl)hexyl] - N - [3 - (3 - indolyl)propyl]amine;

(e) N-cyclohexylmethyl-N - [6 - (4 - cyclohexylmethyl-1 - piperidyl) - hexyl] - N - [3 - (3 - indolyl)propyl]amine [IIa; R₁, R₂, and R₃ are H, R₄ is 4-C₆H₁₁CH₂, R is C₆H₁₁CH₂, Y' is (CH₂)₆, Y'' is (CH₂)₃], M.P. 66.6–70.4° C. (corr.) (recrystallized from hexane) by lithium aluminum hydride reduction of N-cyclohexylcarbonyl-N-[6-(4 - cyclohexylmethyl - 1 - piperidyl)hexyl] - N - [3 - (3-indolyl)propyl]amine;

(f) N - methyl - N - [3 - (4 - cyclohexylmethyl - 1 - piperidyl)propyl] - N - [3 - (3 - indolyl)propyl]amine dihydrochloride [IIa; R₁, R₂, and R₃ are H, R₄ is

R is CH₃, Y' and Y'' are (CH₂)₃], M.P. 239.0–242.0° C. (corr.) (recrystallized from an ethanol-ether mixture) by lithium aluminum hydride reduction of N-formyl-N-[3-(4 - cyclohexylmethyl - 1 - piperidyl)propyl] - N - [3-(3-indolyl)propyl]amine;

(g) N - cyclohexylmethyl - N - [3 - (4 - cyclohexylmethyl - 1 - piperidyl)propyl] - N - [3 - (3 - indolyl)propyl]amine [IIa; R₁, R₂, and R₃ are H, R₄ is 4-C₆H₁₁CH₂, R is C₆H₁₁CH₂, Y' and Y'' are (CH₂)₃], M.P. 104.0–105.2° C. (corr.) (recrystallized from hexane) by lithium aluminum hydride reduction of N-cyclohexylcarbonyl-N-[3 - (4 - cyclohexylmethyl - 1 - piperidyl)propyl] - N - [3-(3-indolyl)propyl]amine; and (h) N - (3,4 - dichlorobenzyl) N - [3 - (4 - cyclohexylmethyl - 1 - piperidyl)propyl] - N - [3-(3-indolyl)propyl]amine [IIa; R₁, R₂, and R₃ are H, R₄ is 4-C₆H₁₁CH₂, R is 3,4-Cl₂C₆H₃CH₂, Y' and Y'' are (CH₂)₃], M.P. 65.8–69.4° C. (corr.) (recrystallized from hexane) by lithium aluminum hydride reduction of N-(3,4-dichlorobenzoyl)-N - [3 - (4 - cyclohexylmethyl - 1 - piperidyl)propyl]-N-[3-(3-indolyl)propyl]amine.

Example 23

N - (β - phenylpropionyl) - N - [6 - (4 - cyclohexylmethyl - 1 - piperidyl)hexyl] - N - [3 - (3 - indolyl)propyl]amine [IIa; R₁, R₂, and R₃ are H, R₄ is 4-C₆H₁₁CH₂, R is C₆H₅CH₂CH₂CO].

N - cinnamoyl - N - [6 - (4 - cyclohexylmethyl - 1 - piperidyl)hexyl]-N-[3-(3-indolyl)propyl]amine (15.92 g., 0.028 mole) was dissolved in 200 ml. of absolute ethanol and reduced with hydrogen over 0.5 g. of palladium-on-charcoal under an initial pressure of 56 pounds p.s.i. When reduction was complete, the catalyst was removed by filtration, and the filtrate taken to dryness. Recrystallization of the residue from hexane afforded 6.0 g. of N - (β - phenylpropionyl) - N - [6 - (4 - cyclohexylmethyl - 1 - piperidyl)hexyl] - N - [3 - (3 - indolyl)propyl]amine, M.P. 63.4–68.0° C. (corr.)

Example 24

N - [N' - (4 - chlorophenyl)carbamyl] - N - [3 - (4-cyclohexylmethyl - 1 - piperidyl)propyl] - N - [3-(3-indolyl)propyl]amine [IIa; R₁, R₂, and R₃ are H, R₄ is

R is 4-ClC₆H₄NHCO, Y' and Y'' are (CH₂)₃].

To a stirred solution of 5.93 g. (0.015 mole) of N-[3-(4 - cyclohexylmethyl - 1 - piperidyl)propyl] - N - [3 - (3-indolyl)-propyl]amine in 325 ml. of benzene was added a solution of 2.86 g. (0.018 mole) of p-chlorophenylisocyanate, and the mixture was stirred for one hour. After standing overnight, the mixture was filtered, the filtrate taken to dryness, and the residue recrystallized twice from acetone and twice from an ethyl acetate-hexane mixture to give 4.31 g. of N-[N'-(4-chlorophenyl)carbamyl] - N - [3 - (4 - cyclohexylmethyl - 1 - piperidyl)propyl] - N - [3 - (3 - indolyl)propyl]amine, M.P. 157.0–158.8° C. (corr.)

Example 25

Using a procedure similar to that described in Example 24, there was obtained:

(a) N - [N' - ( 4 - chlorophenyl)carbamyl] - N - [6-(4 - cyclohexylmethyl - 1 - piperidyl)hexyl] - N - [3 - (3-indolyl)propyl]amine [IIa; R₁, R₂, and R₃ are H, R₄ is 4-C₆H₁₁CH₂, R is 4-ClC₆H₄NHCO, Y' is (CH₂)₆, Y'' is (CH₂)₃], M.P. 76.4–87.0° C. (corr.) (recrystallized from an ethyl acetate-hexane mixture) from N-[6-(4-cyclohexylmethyl - 1 - piperidyl)hexyl] - N - [3 - (3 - indolyl)propyl]amine and p-chlorophenylisocyanate;

(b) N-(N'-cyclohexylcarbamyl) - N - [3-(4-cyclohexylmethyl-1-piperidyl)propyl] - N - [3-(3-indolyl)propyl]amine [IIa; R₁, R₂, and R₃ are H, R₄ is 4-C₆H₁₁CH₂, R is C₆H₁₁NHCO, Y' and Y'' are (CH₂)₃], M.P. 134.0–137.8° C. (corr.) (recrystallized from acetone) from N-[3-(4-cyclohexylmethyl - 1 - piperidyl)propyl] - N - [3-(3-indolyl)propyl]amine and cyclohexylisocyanate;

(c) N-(N'-butylcarbamyl) - N - [3-(4-cyclohexylmethyl-1-piperidyl)propyl] - N - [3-(3-indolyl)propyl]amine [IIa; R₁, R₂, and R₃ are H, R₄ is 4-C₆H₁₁CH₂, R is C₄H₉NHCO, Y' and Y'' are (CH₂)₃], M.P. 141.0–143.0° C. (corr.) (recrystallized from an ethyl acetate-hexane mixture) from N-[3-(4-cyclohexylmethyl - 1 - piperidyl)propyl]-N-[3-(3-indolyl)propyl]amine and butylisocyanate;

(d) N-(N'- phenylcarbamyl) - N - [3-(4-cyclohexylmethyl - 1 - piperidyl)propyl] - N - [3-(3-indolyl)propyl]amine [IIa; R₁, R₂, and R₃ are H, R₄ is 4-C₆H₁₁CH₂, R is C₆H₅NHCO, Y' and Y'' are (CH₂)₃], M.P. 148–150.0° C. (corr.) (recrystallized from an ethyl acetate-hexane mixture) from N-[3-(4-cyclohexylmethyl-1-piperidyl)propyl]-N-[3-(3-indolyl)propyl]amine and phenylisocyanate;

(e) N - [N' - (4 - fluorophenyl)carbamyl] - N - [3-(4-cyclohexylmethyl - 1 - piperidyl)propyl] - N - [3-(3-indolyl)propyl]amine [IIa; R₁, R₂, and R₃ are H, R₄ is 4-C₆H₁₁CH₂, R is 4-FC₆H₄NHCO, Y' and Y'' are (CH₂)₃], M.P. 125.0–127.0° C. (corr.) (recrystallized from an ethyl acetate-hexane mixture) from N-[3-(4-cyclohexylmethyl - 1 - piperidyl)propyl] - N - [3-(3-indolyl)propyl]amine and 4-fluorophenylisocyanate;

(f) N - (N' - butylcarbamyl) - N - [4 - (4 - cyclohexylmethyl - 1 - piperidyl)butyl] - N - [3-(3 - indolyl)propyl]amine [IIa; R₁, R₂, and R₃ are H, R₄ is 4-C₆H₁₁CH₂, R is C₄H₉NHCO, Y' is (CH₂)₄, Y'' is (CH₂)₃], M.P. 74.0–78.0° C. (corr.) (recrystallized from hexane) from N-[4-(4-cyclohexylmethyl-1-piperidyl)butyl] - N - [3-(3-indolyl)propyl]amine and butylisocyanate;

(g) N-(N'-cyclohexylcarbamyl) - N - [6-(4-cyclohexylmethyl - 1 - piperidyl)hexyl] - N - [3-(3-indolyl)propyl]amine [IIa; R₁, R₂, and R₃ are H, R₄ is 4-C₆H₁₁CH₂, R is C₆H₁₁NHCO, Y' is (CH₂)₆, Y'' is (CH₂)₃], M.P. 120.8–122.6° C. (corr.) (recrystallized from an ethyl acetate-hexane mixture) from N-[6-(4-cyclohexylmethyl- 1-piperidyl)hexyl]-N-[3-(3-indolyl)propyl]amine and cyclohexylisocyanate;

(h) N-[N'-(4-methoxyphenyl)carbamyl] - N - [6-(4-cyclohexylmethyl - 1 - piperidyl)hexyl] - N - [3-(3 - indolyl)propyl]amine [IIa; $R_1$, $R_2$, and $R_3$ are H, $R_4$ is 4-$C_6H_{11}CH_2$, R is 4-$CH_3OC_6H_4NHCO$, Y' is $(CH_2)_6$, Y'' is $(CH_2)_3$], M.P. 103.0–108.0° C. (corr.) (recrystallized from an ethyl acetate-hexane mixture) from N-[6-(4-cyclohexylmethyl-1-piperidyl)hexyl] - N - [3-(3-indolyl)propyl]amine and 4-methoxyphenylisocyanate; and (i) N - [N' - (4 - fluorophenyl)carbamyl] - N - [3 - (4-cyclohexylmethyl - 1 - piperidyl)propyl] - N - [4-(3-indolyl)butyl]amine [IIa; $R_1$, $R_2$, and $R_3$ are H, $R_4$ is 4-$C_6H_{11}CH_2$, R is 4-$FC_6H_4NHCO$, Y' is $(CH_2)_3$, Y'' is $(CH_2)_4$], M.P. 121.6–131.0° C. (corr.) (recrystallized from an ethyl acetate-hexane mixture) from N-[3-(4-cyclohexylmethyl - 1 - piperidyl)propyl] - N - [4-(3-indolyl)butyl]amine and 4-fluorophenylisocyanate.

Example 26

N-carbamyl-N-[3-(4 - cyclohexylmethyl - 1 - piperidyl)propyl]-N-[3-(3-indolyl)propyl]amine [IIa; $R_1$, $R_2$, and $R_3$ are H, $R_4$ is 4-$C_6H_{11}CH_2$, R is $CONH_2$, Y' and Y'' are $(CH_2)_3$].

By reacting N-[3-(4-cyclohexylmethyl - 1 - piperidyl)propyl]-N-[3-(3-indolyl)propyl]amine with sodium isocyanate in the presence of hydrochloric acid, there is obtained N-carbamyl-N-[3-(4-cyclohexylmethyl-1-piperidyl)propyl]-N-[3-(3-indolyl)propyl]amine.

Example 27

N-thiocarbamyl-N-[3-(4 - cyclohexylmethyl - 1 - piperidyl)propyl]-N-[3-(3-indolyl)propyl]amine [IIa; $R_1$, $R_2$, and $R_3$ are H, $R_4$ is 4-$C_6H_{11}CH_2$, R is $CSNH_2$, Y' and Y'' are $(CH_2)_3$].

By reacting N-[3-(4-cyclohexylmethyl - 1 - piperidyl)propyl]-N-[3-(3-indolyl)propyl]amine with sodium isothiocyanate in the presence of hydrochloric acid, there is obtained N-thiocarbamyl-N-[3-(4-cyclohexylmethyl-1-piperidyl)propyl]-N-[3-(3-indolyl)propyl]amine.

Example 28

N-(N'-ethylthiocarbamyl) - N - [3-(4-cyclohexylmethyl-1-piperidyl)propyl] - N - [3-(3 - indolyl)propyl]amine [IIa; $R_1$, $R_2$, and $R_3$ are H, $R_4$ is 4-$C_6H_{11}CH_2$, R is $CSNHC_2H_5$, Y' and Y'' are $(CH_2)_3$].

By reacting N-[3-(4-cyclohexylmethyl - 1 - piperidyl)propyl]-N-[3-(3-indolyl)propyl]amine with ethylisothiocyanate there is obtained N-(N'-ethylthiocarbamyl)-N-[3-(4-cyclohexylmethyl - 1 - piperidyl)propyl] - N - [3-(3-indolyl(propyl]amine.

Example 29

N-(N',N'-dimethylcarbamyl) - N - [3 - (4 - cyclohexylmethyl - 1 - piperidyl)propyl] - N - [3-(3-indolyl)propyl]amine [IIa; $R_1$, $R_2$, and $R_3$ are H, $R_4$ is 4-$C_6H_{11}CH_2$, R is $CON(CH_3)_2$, Y' and Y'' are $(CH_2)_3$].

By reacting N-[3-(4-cyclohexylmethyl - 1 - piperidyl)propyl]-N-[3-(3-indolyl)propyl]amine with dimethylcarbamyl chloride (prepared from dimethylamine and one molar equivalent of phosgene) in the presence of an acid-acceptor, there is obtained N-(N',N'-dimethylcarbamyl)-N-[3-(4-cyclohexylmethyl - 1 - piperidyl)propyl] - N - [3-(3-indolyl)propyl]amine.

Example 30

N-(N',N'-dimethylthiocarbamyl) - N - [3-(4-cyclohexylmethyl-1-piperidyl)propyl] - N - [3-(3-indolyl)propyl]amine [IIa; $R_1$, $R_2$, and $R_3$ are H, $R_4$ is 4-$C_6H_{11}CH_2$, R is $CSN(CH_3)_2$, Y' and Y'' are $(CH_2)_3$].

By reacting N-[3-(4-cyclohexylmethyl - 1 - piperidyl)propyl]-N-[3-(3-indolyl)propyl]amine with dimethylthiocarbamyl chloride (prepared from dimethylamine and thiophosgene) in the presence of an acid-acceptor, there is obtained N-(N',N'-dimethylthiocarbamyl) - N - [3-(4-cyclohexylmethyl - 1 - piperidyl)propyl] - N - [3-(3-indolyl)propyl]amine.

Example 31

N-(N'-allylcarbamyl) - N - [3-(4 - cyclohexylmethyl-1-piperidyl)propyl]-N-[3-(3-indolyl)propyl]amine [IIa; $R_1$, $R_2$, and $R_3$ are H, $R_4$ is 4-$C_6H_{11}CH_2$, R is $$CONHCH_2CH=CH_2$$

Y' and Y'' are $(CH_2)_3$].

By reacting N-[3-(4-cyclohexylmethyl - 1 - piperidyl)propyl]-N-[3-(3-indolyl)propyl]amine with allylisocyanate, there is obtained N-(N'-allylcarbamyl)-N-[3-(4-cyclohexylmethyl - 1 - piperidyl)propyl] - N - [3-(3-indolyl)propyl]amine.

Example 32

N-(N'-allylthiocarbamyl) - N - [3-(4-cyclohexylmethyl-1-piperidyl)propyl] - N - [3-(3 - indolyl)propyl]amine [IIa; $R_1$, $R_2$, and $R_3$ are H, $R_4$ is 4-$C_6H_{11}CH_2$, R is $CSNHCH_2CH=CH_2$, Y' and Y'' are $(CH_2)_3$].

By reacting N-[3-(4-cyclohexylmethyl - 1 - piperidyl)propyl]-N-[3-(3-indolyl)propyl]amine with allylisothiocyanate, there is obtained N-(N'-allylthiocarbamyl)-N-[3-(4 - cyclohexylmethyl-1-piperidyl)propyl] - N - [3-(3-indolyl)propyl]amine.

Example 33

N-(N',N'-diallylcarbamyl) - N - [3-(4-cyclohexylmethyl-1-piperidyl)propyl] - N - [3-(3 - indolyl)propyl]amine [IIa; $R_1$, $R_2$, and $R_3$ are H, $R_4$ is 4-$C_6H_{11}CH_2$, R is $CON(CH_2CH=CH_2)_2$, Y' and Y'' are $(CH_2)_3$].

By reacting N - [3 - (4-cyclohexylmethyl-1-piperidyl)propyl] - N - [3-(3-indolyl)propyl]amine with diallylcarbamyl chloride (prepared from diallylamine and one molar equivalent of phosgene) in the presence of an acid-acceptor there is obtained N-(N',N'-diallylcarbamyl)-N-[3 - (4 - cyclohexylmethyl-1-piperidyl)propyl]-N-[3-(3-indolyl)propyl]amine.

Example 34

N-(N',N' - diallylthiocarbamyl) - N-[3-(4-cyclohexylmethyl - 1 - piperidyl)propyl]-N-[3-(3-indolyl)propyl]amine [IIa; $R_1$, $R_2$, and $R_3$ are H, $R_4$ is 4-$C_6H_{11}CH_2$, R is $CSN(CH_2CH=CH_2)_2$, Y' and Y'' are $(CH_2)_3$].

By reacting N - [3 - (4-cyclohexylmethyl-1-piperidyl)propyl] - N - [3-(3-indolyl)propyl]amine with diallylthiocarbamyl chloride (prepared from diallylamine and one molar equivalent of thiophosgene) in the presence of an acid-acceptor, there is obtained N-(N',N'-diallylthiocarbamyl) - N - [3-(4-cyclohexylmethyl-1-piperidyl)propyl]-N-[3-(3-indolyl)propyl]amine.

Example 35

N - (N' - phenylthiocarbamyl) - N-[3-(4-cyclohexylmethyl - 1 - piperidyl)propyl]-N-[3-(3-indolyl)propyl]amine [IIa; $R_1$, $R_2$, and $R_3$ are H, $R_4$ is 4-$C_6H_{11}CH_2$, R is $CSNHC_6H_5$, Y' and Y'' are $(CH_2)_3$].

By reacting N - [3 - (4-cyclohexylmethyl-1-piperidyl)propyl] - N - [3 - (3 - indolyl)propyl]amine with phenylisothiocyanate, there is obtained N - (N'-phenylthiocarbamyl) - N - [3-(4-cyclohexylmethyl-1-piperidyl)propyl]-N-[3-(3-indolyl)propyl]amine.

Example 36

N - (N' - cyclohexylthiocarbamyl)-N-[3-(4-cyclohexylmethyl - 1 - piperidyl)propyl]-N-[3-(3-indolyl)propyl]amine [IIa; $R_1$, $R_2$, and $R_3$ are H, $R_4$ is 4-$C_6H_{11}CH_2$, R is $CSNHC_6H_{11}$, Y' and Y'' are $(CH_2)_3$].

By reacting N - [3 - (4-cyclohexylmethyl-1-piperidyl)propyl] - N - [3-(3-indolyl)propyl]amine with cyclohexylisothiocyanate, there is obtained N-(N'-cyclohexylthiocarbamyl) - N - [3-(4-cyclohexyl-1-piperidyl)propyl]-N-[3-(3-indolyl)-propyl]amine.

The compounds of Formulas Ia, b, c and IIa, b, c have been shown to have hypotensive activity in rats. Hypotensive activity was determined by subcutaneous administration in renal hypertensive rats using the photoelectric tensometer foot method described by Kersten et al., J. Lab. Clin. Med. 32, 1090 (1957). The activities of the compounds were expressed in terms of the Minimum Effective Hypotensive Dose (MEHD) which is defined as the smallest dose which produced at least one significant fall below the control blood pressure reading, where a significant fall is interpreted as being below the limit of two standard errors. The activities thus obtained for some of the compounds of the invention are as follows: N - {3 - [4 - (N-ethylcarbamyl)-1-piperidyl]propyl}-N-[β-(3-indolyl)-propionyl]amine [Formula Ia, Example 10(e)], MEHD=1.0 mg./kg. N - {3-[4-(N-ethylcarbamyl) - 1 - piperidyl]propyl}-N-[β-(1-indolyl)-propionyl] amine [Formula Ic, Example 10(f)], MEHD=1.0 mg./kg. N,N - bis - {3 - [4-(N-ethylcarbamyl)-1-piperidyl]propyl}-N-[2-(3-indolyl)ethyl]amine [Formula IIa, Example 13], AED$_{50}$ (Average Effective Dose)=10.0 mg./kg.

The compounds of Formulas Ia, b, and c have been found to possess monoamine oxidase inhibitory activity. This activity was determined in mice using the photocell activity cage method described by Dews, Brit. J. Pharmacol., 8, 46 (1953). The mice were pretreated with the compound prior to treatment with 5-hydroxytrytophane or (levo)-3,4-dihydroxyphenylalanine and the stimulatory effect measured by the number of times the animal broke the photocell beam during a period of thirty minutes. The dose necessary to produce psychomotor stimulation was noted and the activities expressed relative to the activity of iproniazid. Thus N - [3 - (4-carbamyl-1-piperidyl)propyl] - N - [β-(3-indolyl)propionyl]amine [Formula Ia, Example 9] was found to have about one tenth the monoamine oxidase inhibitory activity of iproniazid.

The compounds of Formulas Ia, b, and c have been found to possess coronary dilator activity as determined by studies in pituitrin constricted isolated rabbit heart using a Langendorph perfusion apparatus and the activities expressed in terms of percent dilation. Thus N-[3-(4-carbamyl - 1 - piperidyl)propyl]-N-[β-(3-indolyl)propionyl]amine [Formula Ia, Example 9] produced 8.1% coronary dilatation.

The compounds of Formulas IIa, b, and c have been shown to possess mild analgesic activity. Mild analgesic activity was determined using the test procedure described by Randall et al., Arch. intern. pharmacodynamie 111, 409 (1957) which involves eliciting a pain reaction by the application of steadily increasing pressure to the foot of a rat inflamed by prior injection of brewer's yeast into the plantar surface. The pain threshold was measured in terms of the pressure in mm. Hg required to elicit the pain response, and the activities expressed relative to the activity of aspirin. Thus N,N - bis-{3-[4-(N-ethylcarbamyl) - 1 - piperidyl]propyl}-N-[2-(3-indolyl)ethyl]amine [Formula IIa, Example 13] was found to have about 50% of the mild analgesic activity of aspirin.

We claim:
1. A member of the group consisting of compounds having the formula

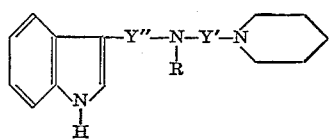

and

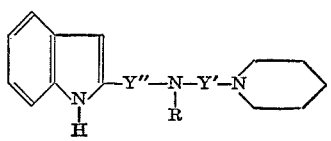

and

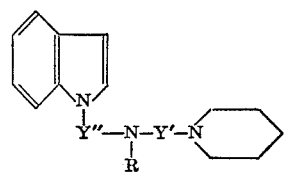

wherein Y' and Y" are each lower-alkylene of from two to seven carbon atoms, and R is

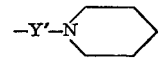

or a member of the group consisting of hydrogen, lower-alkanoyl, lower-alkyl, benzoyl, phenyl-lower-alkyl, phenyl-lower-alkenyl, cycloalkyl-lower-alkanoyl, cycloalkyl-lower-alkyl, phenyl-lower-alkanoyl, phenyl-lower-alkenoyl, pyridylcarbonyl, carboxy-lower-alkanoyl, hydroxy-lower-alkyl, cyano-lower-alkyl, carbamyl, thiocarbamyl, N - lower-alkyl-carbamyl, N - lower-alkylthiocarbamyl, N-N - di-lower-alkylcarbamyl, N,N-di-lower-alkylthiocarbamyl, N - lower-alkenylcarbamyl, N-lower-alkenylthiocarbamyl, N,N-di-lower-alkenylcarbamyl, N,N-di-lower-alkenylthiocarbamyl, N - phenylcarbamyl, N-phenylthiocarbamyl, N-cycloalkylcarbamyl, N-cycloalkylthiocarbamyl, or phenoxy-lower-alkanoyl and wherein the cycloalkyl-containing groups of the R moiety contain from three to eight ring carbon atoms.

2. A compound having the formula

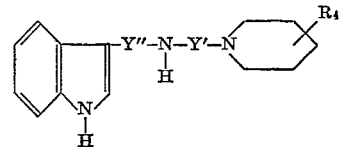

wherein Y' and Y" are lower-alkylene of from two to seven carbon atoms; and R$_4$ is cycloalkyl-lower-alkyl containing from three to eight ring carbon atoms in the cycloalkyl moiety.

3. A compound having the formula

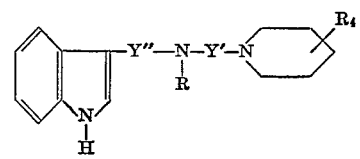

wherein Y' and Y" are lower-alkylene of from two to seven carbon atoms; R$_4$ is cycloalkyl-lower-alkyl containing from three to eight ring carbon atoms in the cycloalkyl moiety; and R is phenyl-lower-alkyl.

4. A compound having the formula

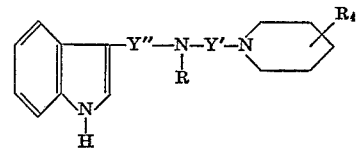

wherein Y' and Y" are lower-alkylene of from two to seven carbon atoms; R$_4$ is cycloalkyl-lower-alkyl containing from three to eight ring carbon atoms in the cycloalkyl moiety; and R is lower alkanoyl.

5. A compound having the formula

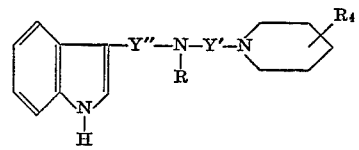

wherein Y' and Y" are lower-alkylene of from two to seven carbon atoms; R$_4$ is cycloalkyl-lower-alkyl containing from three to eight ring carbon atoms in the cycloalkyl moiety; and R is lower-alkyl.

6. A compound having the formula

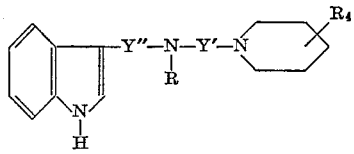

wherein Y' and Y" are lower-alkylene of from two to seven carbon atoms; R₄ is cycloalkyl-lower-alkyl containing from three to eight ring carbon atoms in the cycloalkyl moiety; and R is phenyl-lower-alkenoyl.

7. A compound having the formula

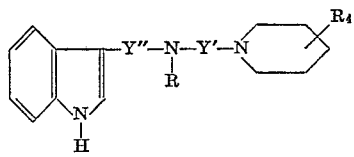

wherein Y' and Y" are lower-alkylene of from two to seven carbon atoms; R₄ is cycloalkyl-lower-alkyl containing from three to eight ring carbon atoms in the cycloalkyl moiety; and R is hydroxy-lower-alkyl.

8. A compound having the formula

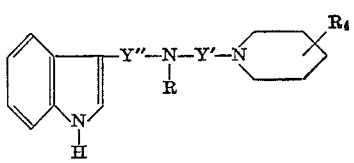

wherein Y' and Y" are lower-alkylene of from two to seven carbon atoms; R₄ is N-lower-alkylcarbamyl; and R is the group

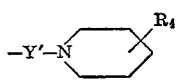

wherein Y' and R₄ have the meanings given above.

9. A compound having the formula

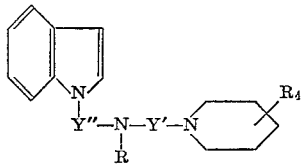

wherein Y' and Y" are lower-alkylene of from two to seven carbon atoms; R₄ is N-lower-alkylcarbamyl; and R is the group wherein Y' and R₄ have the meanings given above.

10. N - [3 - (4-cyclohexylmethyl-1-piperidyl)propyl]-N-[3-(3-indolyl)propyl]amine.
11. N - [6 - (4-cyclohexylmethyl-1-piperidyl)hexyl]-N-[3-(3-indolyl)propyl]amine.
12. N - benzyl - N - [6-(4-cyclohexylmethyl-1-piperidyl)hexyl]-N-[3-(3-indolyl)propyl]amine.
13. N - (4 - trifluoromethylbenzyl)-N-[6-₁4-cyclohexylmethyl - 1 - piperidyl)hexyl]-N-[3-(3-indolyl)propyl]amine.
14. N - acetyl - N - [6-(4-cyclohexylmethyl-1-piperidyl)hexyl]-N-[3-3(-indolyl)propyl]amine.
15. N - ethyl - N - [6-(4-cyclohexylmethyl-1-piperidyl)hexyl]-N-[3-(3-indolyl)propyl]amine.
16. N - cinnamoyl - N - [6-(4-cyclohexylmethyl-1-piperidyl)hexyl]-N-[3-(3-indolyl)propyl]amine.
17. N - (4-hydroxybutyl)-N-[3-(4-cyclohexylmethyl-1-piperidyl)propyl]-N-[3-(3-indolyl)propyl]amine.

References Cited

UNITED STATES PATENTS

| | | | |
|---|---|---|---|
| 2,980,692 | 4/1961 | Albertson | 260—293 XR |
| 3,198,807 | 8/1965 | Thominet | 260—294 XR |
| 3,182,071 | 5/1965 | Shavel et al. | 260—294.7 XR |
| 3,183,235 | 5/1965 | Zenitz | 260—293.4 XR |

HENRY R. JILES, Primary Examiner

J. M. FORD, Assistant Examiner

U.S. Cl. X.R.
260—293, 294, 999

PO-1050
(5/69)

UNITED STATES PATENT OFFICE
CERTIFICATE OF CORRECTION

Patent No. 3,461,120    Dated August 12, 1969

Inventor(s) Bernard L. Zenitz and Donald Craig Behn

It is certified that error appears in the above-identified patent and that said Letters Patent are hereby corrected as shown below:

Column 2, lines 35-40, the last formula under IIc should be deleted.  Column 3, line 58, "pheny" should read --phenyl--. Column 5, line 73, "carbonoxy" should read --carboxy--. Column 7, line 52, "bicarbontes" should read --bicarbonates--. Column 12, line 46, "1030 p.s.i." should read --1030 pounds p.s.i.--; line 74, "790 p.s.i." should read --790 pounds p.s.i.--; Column 13, line 16, "210 p.s.i." should read --210 pounds p.s.i.--; line 31, "208 p.s.i." should read --208 pounds p.s.i.--; line 50, "4-CONHHCH$_3$" should read --4-CONHCH$_3$--; line 58, "197 p.s.i." should read --197 pounds p.s.i.--.  Column 14, line 11, "61 p.s.i." should read --61 pounds p.s.i.--; line 24, "59 p.s.i." should read --59 pounds p.s.i.--; line 39, "235 p.s.i." should read --235 pounds p.s.i. line 51, "790 p.s.i." should read --790 pounds p.s.i.--; line 63, "70 p.s.i." should read --70 pounds p.s.i.--.  Column 15, line 7, "63 p.s.i." should read --63 pounds p.s.i.--; line 27, "780 p.s.i." should read --780 pounds p.s.i.--; line 39, "824 p.s.i." should read --824 pounds p.s.i.--.  Column 16, line 64, "N-[3-4-" should read --N-[3-(4- --; line 67, "indoyl" should read --indolyl--.  Column 17, line 7, "metho-6-toluenesulfonate should read --metho-p-toluenesulfonate--.  Column 19, Table A, Example 11(e), line 37, "4-(CH$_2$)$_3$OCOC$_3$H" should read --4-(CH$_2$)$_3$OCOC$_3$H$_7$--; Table A, Example 11(g), line 39, "6-C$_5$H$_6$CH$_2$O" should read --6-C$_6$H$_5$CH$_2$O--.  Column 22, line 54, "N-[-" should read --N-[6- --; line 64, "ectate" should read --acetate--.  Column 24, line 12, "[3-(indolyl)" should read --[3-(3-indolyl)--.  Column 28, line 71, "(4-cyclohexyl-" should read --(4-cyclohexylmethyl- --.  Column 29, line 39, "dilation should read --dilatation--.  Column 32, line 24, Claim 13, "[6-,4-" should read --[6-(4- --; line 28, Claim 14, "[3-3(-indolyl)" should read --[3-(3-indolyl)--.

SIGNED AND SEALED

JUN 30 1970

(SEAL)
Attest:

Edward M. Fletcher, Jr.
Attesting Officer

WILLIAM E. SCHUYLER, JR.
Commissioner of Patents